US005233540A

United States Patent [19]

Andersson et al.

[11] Patent Number: 5,233,540

[45] Date of Patent: Aug. 3, 1993

[54] METHOD AND APPARATUS FOR ACTIVELY REDUCING REPETITIVE VIBRATIONS

[75] Inventors: Anders O. Andersson, Seattle; Richard A. Russo, Everett, both of Wash.

[73] Assignee: The Boeing Company, Seattle, Wash.

[21] Appl. No.: 575,223

[22] Filed: Aug. 30, 1990

[51] Int. Cl.[5] ........................ H04B 15/00; G10K 11/00

[52] U.S. Cl. .................................... 364/508; 364/574; 381/71

[58] Field of Search ........... 364/507, 508, 574, 551.02, 364/581; 381/71; 73/602, 625, 645–648; 416/34

[56] References Cited

U.S. PATENT DOCUMENTS

| | | | |
|---|---|---|---|
| 4,122,303 | 10/1978 | Chaplin et al. | 179/1 |
| 4,153,815 | 5/1979 | Chaplin et al. | 179/1 |
| 4,417,098 | 11/1983 | Chaplin et al. | 381/94 |
| 4,435,751 | 3/1984 | Hori et al. | 364/574 |
| 4,449,235 | 5/1984 | Swigert | 381/71 |
| 4,473,906 | 9/1984 | Warnaka et al. | 381/71 |
| 4,477,505 | 10/1984 | Warnaka | 428/160 |
| 4,480,333 | 10/1984 | Ross | 381/71 |
| 4,489,441 | 12/1984 | Chaplin | 381/71 |
| 4,490,841 | 12/1984 | Chaplin et al. | 381/71 |
| 4,525,791 | 6/1985 | Hagiwara et al. | 364/508 |
| 4,527,282 | 7/1985 | Chaplin et al. | 381/71 |
| 4,562,589 | 12/1985 | Warnaka et al. | 381/71 |
| 4,566,118 | 1/1986 | Chaplin et al. | 381/71 |
| 4,589,133 | 5/1986 | Swinbanks | 381/71 |
| 4,596,033 | 6/1986 | Swinbanks | 381/71 |
| 4,600,863 | 7/1986 | Chaplin et al. | 318/114 |
| 4,626,730 | 12/1986 | Hubbard, Jr. | 310/326 |
| 4,654,871 | 3/1987 | Chaplin et al. | 381/72 |
| 4,669,122 | 5/1987 | Swinbanks | 381/71 |
| 4,683,590 | 7/1987 | Miyoshi et al. | 381/71 |
| 4,689,821 | 8/1987 | Salikuddin et al. | 381/71 |
| 4,715,559 | 12/1987 | Fuller | 244/1 |
| 4,736,431 | 4/1988 | Allie et al. | 381/71 |
| 4,947,356 | 8/1990 | Elliott et al. | 364/574 |
| 4,947,435 | 8/1990 | Taylor | 381/71 |

FOREIGN PATENT DOCUMENTS

| | | |
|---|---|---|
| 0252647 | 1/1988 | European Pat. Off. . |
| WO88/02912 | 4/1988 | PCT Int'l Appl. . |
| 2187063A | 8/1987 | United Kingdom . |
| 2191063 | 12/1987 | United Kingdom . |

OTHER PUBLICATIONS

Taylor, R. B., P. E. Zwicke, P. Gold and W. Miao, "Analytical Design and Evaluation of an Active Control System for Helicopter Vibration Reduction and Gust Response Alleviation," NASA, Jul. 1980.

*Primary Examiner*—Thomas G. Black
*Assistant Examiner*—Michael Zanelli
*Attorney, Agent, or Firm*—Christensen, O'Connor, Johnson & Kindness

[57] ABSTRACT

A method and apparatus for reducing repetitive vibrations in a region or structure by applying a plurality of control vibrations via a plurality of actuators (13) located in the region or structure (11) and cyclically updating the control vibrations to improve the reduction of the repetitive vibrations are disclosed. The repetitive vibrations are sensed (14) at a plurality of locations in the region or structure and decomposed into a number of frequency components. Next, a first estimate of each control vibration, formed of the same frequency components, that together will reduce the sensed vibrations is made. Each first control vibration estimate is applied to the region or structure via an actuator (13). Thereafter, each control vibration is cyclically updated to improve the reduction of the sensed vibrations whether or not changes occur in the repetitive vibrations, the region or structure (11), or the apparatus used to carry out the method of the invention. Each update cycle is begun by decomposing the sensed vibrations (which are now formed by the control vibrations and the repetitive vibrations) into the same frequency components as before. The greatest-amplitude frequency components are selected for updating. Transfer function matrices modeling the system actuator-to-sensor response characteristics are used to calculate updates for the selected frequency components. The updates are used to modify the control vibrations.

80 Claims, 14 Drawing Sheets

METHOD AND APPARATUS FOR ACTIVELY REDUCING REPETITIVE VIBRATIONS

TECHNICAL AREA

This invention is directed to methods and apparatus for reducing vibrations and, more particularly, to methods and apparatus for actively reducing repetitive vibrations.

BACKGROUND OF THE INVENTION

Various methods and apparatus have been proposed for actively reducing vibrations in a region containing a gas or liquid or in a structure of solid bodies. The concept of actively reducing vibrations consists of introducing control vibrations to combine with the vibrations in a region or structure so that the resultant vibrations in the region or structure are of a lower amplitude than the vibrations in the region or structure without the control vibrations. The active reduction of audible noise in a region has been particularly pursued, e.g., the reduction of noise in an aircraft cabin generated by a jet or propeller engine. Actively reducing vibrations is of considerable importance for low-frequency vibrations because of the difficulty in passively reducing low-frequency vibrations. Passive reduction typically refer to the use of vibration absorbing materials such as sound board in the case of noises in gases. The volume of such vibration absorbing materials needed to be effective increases considerably as the frequency of the vibration is decreased and, thus, is impractical in applications where weight and volume are constrained.

Recently, devices that reduce vibrations in a region or structure by sensing vibrations in the region or structure, decomposing the sensed vibrations into frequency components, calculating output frequency components with some frequency-domain operation, composing control vibrations from the output frequency components, and applying the control vibrations in the region or structure via actuators to reduce the sensed vibrations have been introduced. Generally referred to herein as frequency-domain vibration controllers, such controllers reduce repetitive vibrations produced by one or more repetitive vibration sources by performing a frequency-domain operation to a present cycle of the sensed vibrations to determine control vibrations and introducing the control vibrations at a later cycle of the sensed vibrations. The control vibrations reduce the sensed vibrations, which consist of the repetitive vibrations introduced by the repetitive vibration source and the control vibrations introduced by the actuators. The control vibrations can be cyclically updated to increase the amount of reduction.

U.S. Pat. No. 4,525,791 discloses a frequency-domain vibration controller for reducing repetitive vibrations in a structure that consists of an induction apparatus such as an electrical transformer or a rotating induction motor. A plurality of actuators in the form of shakers are attached to the structure, e.g., the iron core of a transformer, and the shakers apply control vibrations to the structure to reduce the vibrations in the structure. The vibration controller disclosed in the cited patent updates the control vibration of each actuator sequentially and individually with a heuristic frequency-domain operation that adjusts either the phase or amplitude of the control vibration. Since the vibration controller refines the control vibration of each actuator sequentially, it does not fully realize the control capability of the plurality of actuators that can be achieved if the control vibrations are updated simultaneously.

U.K. Patent Application No. GB2,191,063A, teaches a frequency-domain vibration controller that updates all control vibrations simultaneously. The frequency-domain controller described in this patent application is intended to be used to reduce undesired vibrations in the form of audible noise in a region such as the interior of a factory, in which, the undesired noise may be caused by repetitive machinery, for example. Loudspeakers introduce control vibrations or noises in the region to reduce the undesired noise. The plurality of control noises are cyclically updated by a frequency-domain operation involving a transfer function matrix. The transfer function matrix is updated so as to make the controller adaptive. Unfortunately, the method of updating the transfer function matrix requires several cycles and special modification of the control noises to update all elements of the transfer function matrix. Additional problems in the prior art are discussed in the following paragraphs.

Generally, in frequency-domain vibration controllers, the frequency components into which each sensed vibration is decomposed and the frequency components that compose each control vibration are the same set of frequency components; albeit each frequency component of a sensed vibration and each frequency component of a control vibration has its own amplitude and phase. On the one hand, it is desirable to use a large set of frequency components so that each sensed vibration can be accurately decomposed and so that a large number of frequency components of the sensed vibrations can be reduced with corresponding frequency components of the control vibrations. On the other hand, because the computation of the control vibrations is accomplished with an electronic processor, the number of frequency components has generally been held low so that the update cycle of decomposing the sensed vibrations into frequency components, calculating output frequency components with some frequency-domain operation, and composing control vibrations from the output frequency components is relatively fast. The present invention addresses these opposing considerations by decomposing each sensed vibration into a large number of frequency components and composing each control vibration with the same large number of frequency components while achieving a relatively fast update cycle. With each update cycle of the method of the present invention, the waveform of each control vibration approaches the optimum waveform that will maximize the reduction of the sensed vibrations.

A fast update cycle is desired so that each control vibration quickly approaches the optimum waveform that will maximize the reduction of the sensed vibrations. For each control vibration to quickly approach the optimum waveform, the update cycle must include a relatively accurate method of updating the shape of the waveform each update cycle in addition to the update cycle being relatively fast. Further, the method of updating the shape of the waveform of each control vibration should be accurate with or without changes occurring in the repetitive vibrations, the region or structure, or the frequency-domain vibration controller. With an extremely inaccurate method, a control vibration would never approach the optimum waveform regardless of the number of update cycles performed. In the opposite extreme, a perfectly accurate method would produce the optimum waveform in a single update cycle. The present invention uses an accurate and relatively fast method of updating the waveform of each control vibration. The method of updating each control vibration is accurate with or without changes occurring in a preconsidered set of parameters. The frequency of the repetitive vibrations is a parameter which changes significantly in several applications of frequency-domain vibration controllers. Therefore, frequency would likely be a preconsidered parameter, so that the method of updating each control vibration would be accurate whether or not changes occur in the frequency of the repetitive vibrations.

In some applications of frequency-domain vibration controllers, several parameters of the repetitive vibrations, the region or structure, and the frequency-domain vibration controller change significantly. In these applications, it is not practical to preconsider the parameter changes. Rather, in these applications, a method of adapting (updating) the method of updating the control vibrations is needed to maintain the accuracy of the method of updating the control vibrations. The previously mentioned foreign patent application, U.K. Patent Application No. GB2,191,063A, provides such a method of adapting. However, as was mentioned, the disclosed method of adapting requires several update cycles and requires the introduction of special control vibrations. The present invention provides an alternative method of updating each control vibration. This alternative method of updating each control vibration is completely adapted (updated) each update cycle so that the accuracy of the method of updating each control vibration is maintained or, better still, improved.

SUMMARY OF THE INVENTION

In accordance with this invention, a method and apparatus for reducing repetitive vibrations in a region or structure by applying a plurality of control vibrations via actuators located in the region or structure and cyclically updating the control vibrations are provided. The repetitive vibration at each of a plurality of locations in the region or structure is sensed and each sensed vibration is decomposed into a number of frequency components that together define the sensed vibration. Next, an estimate of a plurality of control vibrations that together will reduce the sensed vibrations is made. Each control vibration is composed of the frequency components into which each sensed vibration is decomposed. The control vibrations are each applied to the region or structure via an actuator. Thereafter, each control vibration is cyclically updated to improve the reduction of the sensed vibrations whether or not changes occur in the repetitive vibrations, the region or structure, or the apparatus used to carry out the method of the invention. Each update cycle is begun by sensing the vibration at each of the plurality of locations in the region or structure at which a sensor is located; each sensed vibration is formed by the combination of the repetitive vibrations and the control vibrations. Each sensed vibration is decomposed into the same frequency components as before, providing the amplitude and phase (complex amplitude) of each frequency component of the decomposition. The frequency components with the greatest amplitude are selected for updating. For the frequency components selected, transfer function matrices modeling the system actuator-to-sensor response characteristics for all actuator/sensor combinations are used to calculate an amplitude and phase update for each of the selected frequency components of each control vibration. The amplitude and phase updates are used to update the amplitudes and phases of the control vibration frequency components. The updated frequency components of each control vibration are together inverse-decomposed to obtain updated control vibrations. The update cycle is concluded by superseding each control vibration applied via an actuator with the corresponding updated control vibration.

In accordance with further aspects of the invention, the transfer function matrix for each of several frequencies is stored and the stored matrices are used to update the selected control vibration frequency components. For each control vibration, the amplitude and phase update for a frequency component are calculated by first calculating several estimates of the update needed to minimize the amplitudes of the sensed vibrations. Each estimate is calculated using a stored transfer function matrix corresponding to a frequency near that of the frequency component. The update estimates are then interpolated to obtain the amplitude and phase update for the frequency component.

Alternatively, a single transfer function matrix can be used to update each frequency component. The transfer function matrix for each frequency component is cyclically updated to improve its accuracy by observing the changes in the frequency component of the sensed vibrations following changes in the same frequency component of the control vibrations and by considering the present transfer function matrix for the frequency component. The amplitude and phase updates for a frequency component are calculated using the single transfer function matrix stored for the frequency component after the transfer function matrix is updated.

The preferred form of an apparatus formed in accordance with the invention includes: a plurality of sensors, an input system, a controller, an output system, a plurality of actuators and a synchronization signal generator. The sensors and actuators are dispersed in the region or structure. The input system comprises a sampling system, an input memory, and a digital signal processor (DSP) that may be shared with the output system. Signals produced by the sensors are applied to the input of the sampling system, and the sampling system is coupled to the input memory. The controller includes a central memory and a master processor. The DSP is coupled to both the input memory and the central memory. The master processor is also coupled to the central memory. The output system includes an output memory, an output sequencer, and the DSP, if shared with the input system, or another DSP. In addition to its other connections, the DSP is coupled to the output memory to which the output sequencer is also coupled. Each actuator is coupled to a separate output of the output sequencer. The synchronization signal generator applies a synchronization signal to the sampling system, the master processor, and the output sequencer. In operation, the sampling system converts the analog input signals produced by the sensors into corresponding digital input signals and stores the digital input signals in the input memory. The operation of the sampling system is synchronized by the synchronization signal produced by the synchronization signal generator. The DSP decomposes the digital input signals into a set of frequency components by performing a Fast Fourier Transformation (FFT) on each digital input signal. The DSP stores the amplitudes and phases determined by the FFT in the central memory. Using the data in the central memory, the master processor selects the frequency components to be updated and calculates frequency component amplitude and phase updates in one of the manners described previously. The master processor stores the amplitude and phase updates in the central memory. The master processor uses the amplitude and phase updates to update the amplitudes and phases of the control vibration frequency components stored in the central memory. The DSP inverse decomposes the updated amplitudes and phases by performing an inverse FFT for each control vibration. The DSP uses the resulting digital control signals to supersede the digital control signals, which are stored in the output memory. The output sequencer converts each digital control signal to an analog control signal and simultaneously applies the analog control signals to the inputs of the actuators. In response each actuator generates a corresponding control vibration. The digital-to-analog conversion performed by the output sequencer is synchronized by the synchronization signal produced by the synchronization signal generator.

As will be appreciated from the foregoing brief summary, a method and apparatus for reducing repetitive vibrations in a region or structure by applying a plurality of control vibrations via actuators located in the region or structure and cyclically updating the control vibrations to improve the reduction of the repetitive vibrations are provided by this invention. The method and apparatus of the present invention can control a large number of frequency components with a relatively fast update cycle, and can cyclically update control vibrations to approach the achievement of maximum reduction of sensed vibrations utilizing one of two update methods that produce accurate updates whether or not changes occur in the repetitive vibrations, the region or structure, or the apparatus used to carry out the method of this invention.

As will be further appreciated from the foregoing brief summary, the method of the present invention decomposes the sensed vibrations into a large number of frequency components and composes the control vibrations with the same large number of frequency components, while achieving a relatively fast update cycle. In the prior art, the number of frequency components has generally been held low so that the update cycle of decomposing, calculating, and composing is relatively fast. The method of the present invention achieves a relatively fast update cycle because each control vibrations's frequency components of the previous update cycle are retained and only a subset of the frequency components of each control vibration are updated in each update cycle. The subset of frequency components selected are the frequency components that have the greatest sensed vibration amplitude.

It will be further appreciated from the foregoing brief summary that one update method of the invention provides accurate and quickly calculated updates for the control vibrations, whether or not changes occur in preconsidered parameters. In this method, several approximate transfer function matrices are individually used for each frequency component to calculate several amplitude and phase update estimates of the frequency component of a control vibration, and the update estimates are interpolated to calculate the amplitude and phase update that is used to update the control vibration. Since the transfer function matrices are prestored, the calculation of the updates is relatively fast, thereby further increasing the speed of an already fast processor cycle. Transfer function matrices for various combinations of parameter values of the repetitive vibrations, the region or structure, or the apparatus of this invention can be stored; therefore, repetitive vibrations can be effectively reduced for various and changing parameters. In many applications of this invention, the transfer function matrix changes significantly with the frequency of a frequency component, and in such applications it is preferably to store transfer function matrices corresponding to various frequencies; it is such applications that this method focuses on.

It will be still further appreciated from the foregoing brief summary that an alternative update method of the invention adapts the transfer function matrices to changes in any parameter values. In some applications of frequency-domain vibration controllers, many parameters of the repetitive vibrations, the region or structure, and the frequency-domain vibration controller vary and cause significant changes in the actuator-to-sensor response characteristics. In such applications, it is impractical to prestore a transfer function matrix for each possible combination of parameter values. For these applications, the alternative update method is more usable. In the alternative update method, a single transfer function matrix is used for each frequency component. The amplitude and phase updates calculated with each transfer function matrix are able to effectively shape the control vibrations' waveforms towards optimum with or without changes occurring in the repetitive vibrations, the region or structure, or the apparatus used to carry out the method of this invention because each transfer function matrix is updated before it is used to calculate an amplitude and phase update. Unlike the prior art, all elements of a transfer function matrix are updated in a single update cycle. The update is based upon the most recent actuator-to-sensor response characteristics (corresponding to the transfer function matrix) exhibited. Also, the updating of a transfer function matrix is relatively insensitive to random changes in the repetitive vibrations, the region or structure, or the apparatus used to carry out the method of this invention, because the present transfer function matrix is used in the determination of the update for the transfer function matrix.

It will be still further appreciated from the foregoing brief summary that either of the aforementioned update methods can be used to calculate updates for each frequency component into which the sensed vibrations are decomposed, or to calculate updates for only a subset of the frequency components into which the sensed vibrations are decomposed each update cycle and thereby reduce the update cycle processing time. In the latter scheme, the subset of frequency components may be formed according to the previously discussed method of selecting the frequency components with the greatest sensed vibration amplitude.

BRIEF DESCRIPTION OF THE DRAWINGS

The foregoing objects and many of the attendant advantages of this invention will become more readily appreciated as the same becomes better understood by reference to the following detailed description when taken in conjunction with the accompanying drawings wherein.

DETAILED DESCRIPTION OF THE PREFERRED EMBODIMENT

Figure 1:
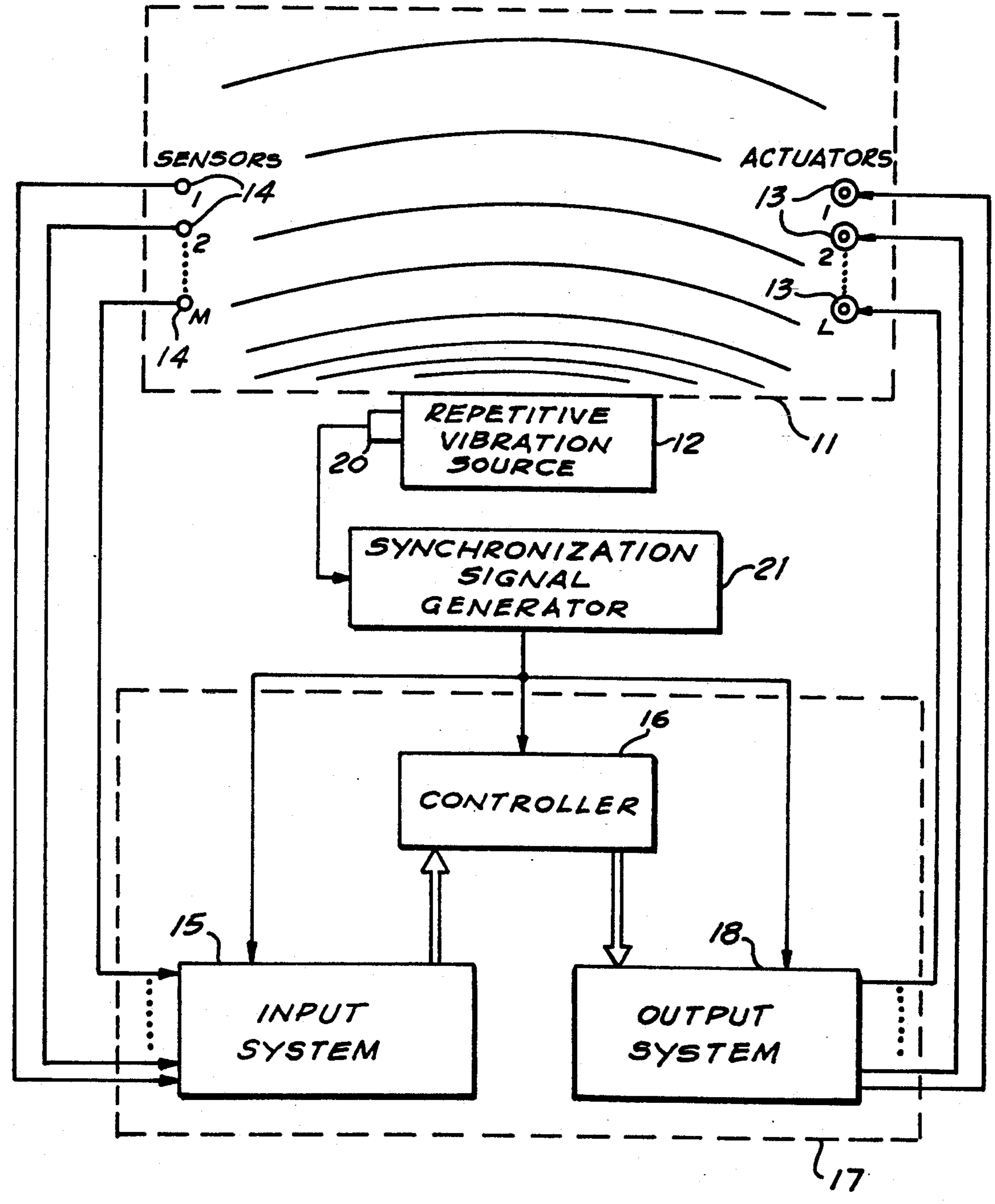
FIG. 1 is a simplified block diagram of an apparatus according to the invention for actively reducing repetitive vibrations.

FIG. 1 is a simplified block diagram of an apparatus formed in accordance with the invention for actively reducing repetitive vibrations in a region or structure 11. A source 12 of repetitive vibrations produces repetitive vibrations in the region or structure 11. The purpose of the apparatus is to reduce the amplitude of the so-produced repetitive vibrations in the region or structure 11 because such vibrations are undesirable. The apparatus includes a plurality of actuators 13 that introduce control vibrations in the region or structure 11 to oppose the repetitive vibrations in the region or structure 11 produced by the source 12. The control vibrations generated by the actuators 13 are dependent on the vibrations sensed by a plurality of sensors 14 in the region or structure. The apparatus includes a multi-input/multi-output (MIMO) feedback control system 17 that cyclically updates the waveform of each control vibration so as to approach minimization of the sensed vibrations. The MIMO feedback control system 17 includes an input system 15, a controller 16 that receives as input the product of the input system 15, and an output system 18 that receives the product of the controller 16. The input system 15 receives as input the output of each sensor 14, and the output system 18 composes control signals using the product of the controller 16 and drives the actuators 13 with these signals. The input system 15, controller 16, and output system 18 use a synchronization signal generated by a synchronization signal generator 21. The synchronization signal generator 21 generates the synchronization signal in response to a reference signal sensed by a sensor 20 coupled to the repetitive vibration source 12.

Take, for example, application of the invention for reduction of repetitive noise in the passenger cabin of a jet aircraft. In this example, the region or structure 11 is the gaseous region of the passenger cabin, and the repetitive vibrations are repetitive noise generated by a jet engine of the aircraft, i.e., the repetitive vibration source 12 is a jet engine of the aircraft. An apparatus according to the invention reduces the repetitive noise to, among other things, improve the comfort of passengers. Further in this example, the actuators 13 are preferably loudspeakers, and the sensors 14 are preferably microphones. Both loudspeakers and microphones are preferably dispersed throughout the passenger cabin, and preferably the number of sensors is greater than the number of actuators. Without these preferred characteristics of actuator/sensor placement and actuator/sensor numbers, the MIMO feedback control system 17 may produce control vibrations that completely reduce the sensed vibrations at each sensor, but result in no appreciable reduction of the repetitive vibrations in the regions between the sensors. Still further in this example, the sensor 20 producing the reference signal is preferably a tachometer monitoring the rotational frequency of the jet engine. The input system 15, controller 16, and output system 18 are preferably on-board electronic devices including digital processors.

It will be appreciated that the invention can be used in various other applications to reduce repetitive vibrations. In such other applications, the input system 15, controller 16, and output system 18 could be comprised of the same electronic devices. However, the choice of sensors and actuators will depend on the application. For example, if the invention is used to reduce repetitive vibrations in a structure that consists of an electrical transformer, the sensors 14 would preferably be accelerometers and the actuators 13 would preferably be shakers; both accelerometers and shakers would be attached to the transformer.

Figure 2:
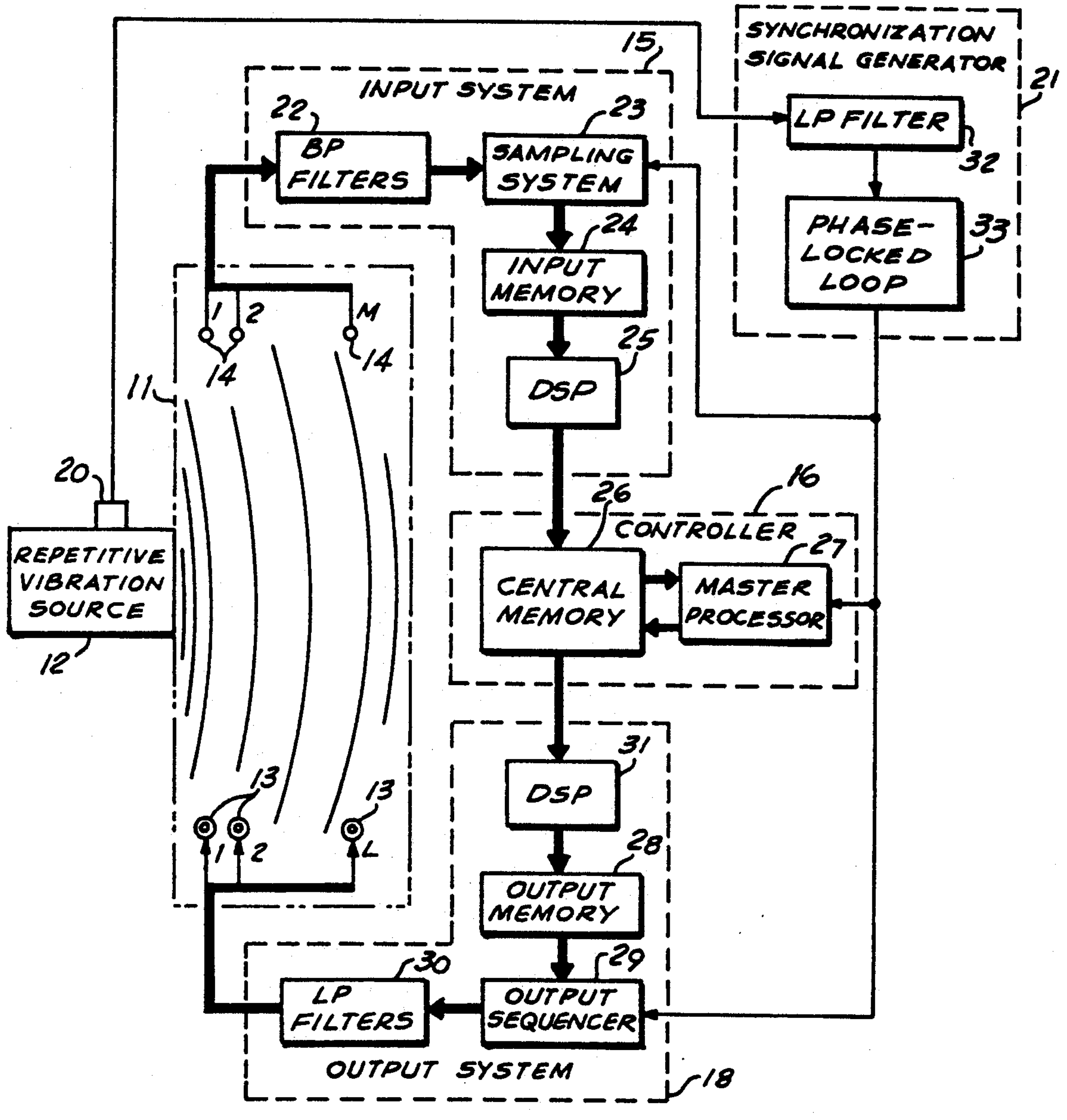
FIG. 2 is a more detailed block diagram of an apparatus according to the invention for actively reducing repetitive vibrations.

The block diagram of FIG. 2 provides more detail of an apparatus formed in accordance with the present invention. Preferred components of input system 15, controller 16, output system 18 and synchronization signal generator 21 are shown. The input system 15 comprises bandpass (BP) filters 22, a sampling system 23, an input memory 24, and a digital signal processor 25 (DSP) that may be shared with the output system 18. The controller 16 includes a central memory 26 and a master processor 27. The input system DSP 25 is coupled to both the input memory 24 and the central memory 26. The master processor 27 is also coupled to the central memory 26. Output system 18 includes an output memory 28, an output sequencer 29, low-pass (LP) filters 30, and a DSP 31. While the input system DSP 25 and the output system DSP 31 are shown as separate processors, preferably they are the same processor alternately performing input and output operations. The output system DSP 31 is coupled to the central memory 26 and the output memory 28. The output sequencer 29 is coupled to the output memory 28. Each low-pass filter 30 is coupled to a separate output of the output sequencer 29, and each actuator 13 is coupled to the output of one of the low-pass filters 30. The synchronization signal generator 21 is comprised of a low-pass (LP) filter 32 and a phase-locked loop 33. The sensor 20 coupled to the repetitive vibration source 12 generates a reference signal which is input to the low-pass filter 32. The output of the low-pass filter 32 is input to the phase-locked loop 33. The phase-locked loop 33 produces the synchronization signal that is input to the sampling system 23, the master processor 27 and the output sequencer 29. The reference signal produced by the sensor 20 is filtered by the low-pass filter 32 to remove any high frequencies in the reference signal which could erroneously trigger the phase-locked loop 33. All components of the apparatus shown in FIG. 2 are well known in the electronics art.

The operation of the apparatus begins with a start-up sequence. During the start-up sequence the sampling system 23 converts the filtered analog input signals produced by the bandpass filters 22 into corresponding digital input signals and stores the digital input signals in the input memory 24. The analog input signals produced by the sensors 14 are filtered by the bandpass filters 22 to limit the frequency band of the input signals to the frequency band of the frequency-domain vibration controller. For example, the high frequencies of the analog input signals are removed to prevent aliasing. The input system DSP 25 decomposes the digital input signals into a set of frequency components S by performing a Fast Fourier Transformation (FFT) on each digital input signal. The input system DSP 25 stores the amplitudes and phases determined by the FFT in the central memory 26. Using the data in the central memory 26, the master processor 27 calculates, as in hereinafter described in detail, the amplitudes and phases of the frequency components to be used to compose the control vibrations. The amplitudes and phases are stored in the central memory 26. The output system DSP 31 inverse-decomposes the amplitudes and phases for each control vibration by performing an inverse FFT. The output system DSP 31 stores the resulting digital control signals in the output memory 28. The output sequencer 29 converts each digital control signal to an analog control signal and simultaneously applies the analog control signals to the inputs of the low-pass filters 30, and the low-pass filters 30 apply the filtered analog control signals to the actuators 13. The analog control signals are passed through the low-pass filters 30 to smooth the analog control signals formed by converting the digital control signals to analog form. In response to the applied signal, each actuator generates a corresponding control vibration.

Thereafter, each control vibration is cyclically updated to improve the reduction of the sensed vibrations. The update cycles are similar to the start-up sequence: the sampling system 23 produces digital input signals which are stored in the input memory 24, the input system DSP 25 performs FFTs on the digital input signals, the master processor 27 calculates amplitudes and phases that are stored in the central memory 26, and the output system DSP 31 performs inverse FFTs. However, the amplitudes and phases calculated by the master processor 27 are used to update the amplitudes and phases of control vibration frequency components, rather than to replace those stored in the central memory 26. The output sequencer 29 operates continously. The update cycle is described in detail hereinafter.

In further detail, the analog input signals produced by the sensors 14 are applied to the input of the bandpass filters 22 and the resulting filtered analog input signals are applied to the input of the sampling system 23. There are M (quantity) sensors 14; each sensor 14 produces an analog input signal that is an electrical signal representing the vibration at the sensor 14. The analog input signals are filtered by the bandpass filters 22 and subsequently converted to corresponding digital input signals by the sampling system 23 with analog-to-digital converters. The filtered analog input signal $p_m(t)$ of the mth sensor 14 is sampled at discrete times $t_k$ of continuous time t, to produce the digital input signal $p_m(t_k)$, i.e., a sequence of digital values. An update cycle is begun by sampling the filtered analog input signals $p_m(t)$ at K (quantity) consecutive discrete times $t_k$, and storing the samples $p_m(t_k)$ in the input memory 24. The number of sample times, K, and the timing thereof, is such that the samples are taken over a span of time equivalent to the period of the repetitive vibrations produced by the repetitive vibration source 12, or a multiple thereof. When the sampling is completed the input memory 24 contains K samples for each sensor; the K samples for the mth sensor define the digital input signal $p_m(t_k)$ $(k=1,2, \ldots, K)$, i.e., a sequence of K digital values.

The input system DSP 25 decomposes each digital input signal $p_m(t_k)$ $(k=1,2, \ldots, K)$ into a set of frequency components by performing an FFT. Each digital input signal $p_m(t_k)$ is decomposed into the same set of frequency components, S; the set containing N (quantity) frequency components. The FFT performed determines the amplitudes and phases of the frequency components for each digital input signal. The amplitudes and phases are stored in pairs in the form of complex amplitudes (complex numbers) in the central memory 26 and are referred to herein as input complex amplitudes. The input complex amplitude of the nth frequency component of the mth digital input signal is represented as $p_m(n)$; $p_m(t_k)$ represents a time-domain signal, and $p_m(n)$ represents a corresponding frequency-domain signal The master processor 27 performs frequency-domain operations on the input complex amplitudes $p_m(n)$ to form corresponding output complex amplitude updates $\Delta a_l(n)$ which will be described in detail hereinafter.

Output complex amplitudes for each of the L (quantity) actuators are stored in the central memory 26; there are N output complex amplitudes for each actuator. The output complex amplitude of the nth frequency component for the lth actuator is represented as $a_l(n)$ herein. A digital control signal for each of the L actuators is stored in the output memory 28. The digital control signal for the lth actuator is a sequence of K digital values and is represented herein as $a_l(t_k)$. The digital control signal $a_l(t_k)$ for the lth actuator is the inverse-decomposition of the output complex amplitudes $a_l(n)$ obtained by performing an inverse FFT on the output complex amplitudes $a_l(n)$. The output complex amplitude $a_l(n)$ is a complex number representation of the amplitude and phase (complex amplitude) of the nth frequency component of the lth digital control signal $a_l(t_k)$. The output sequencer converts each digital control signal $a_l(t_k)$ to a corresponding analog signal $a_l(t)$ with digital-to-analog converters. The analog control signals are passed through low-pass filters 30 and then applied to the actuators 13; the analog control signal $a_l(t)$ is applied to the lth actuator after passing through a low-pass filter 30.

In the start-up sequence of the frequency-domain vibration controller, a first estimate of each control vibration that together will reduce the sensed vibrations is made. More precisely, output complex amplitudes $a_l(n)$ are calculated and stored in the central memory 26. Digital control signals $a_l(t_k)$ are calculated by performing inverse FFTs on the output complex amplitudes and the digital control signals are stored in the output memory 28. The digital control signals $a_l(t_k)$ are used to drive the actuators 13, which as a result, produce the control vibrations.

After the start-up sequence, the output complex amplitudes $a_l(n)$ are updated and corresponding digital control signals $a_l(t_k)$ are calculated each update cycle. As previously mentioned, the master processor 27 performs frequency-domain operations on the input complex amplitudes $p_m(n)$ to form corresponding output complex amplitude updates $\Delta a_l(n)$. The master processor 27 adds the output complex amplitude updates $\Delta a_l(n)$ to the corresponding output complex amplitudes $a_l(n)$ and stores the results in the central memory 26. For the lth actuator, the output system DSP 31 performs an inverse FFT on the output complex amplitudes $a_l(n)$, forming an updated digital control signal $a_l(t_k)$ corresponding to the lth actuator, and stores the result in the output memory 28, thereby superseding the previously stored digital control signal for the lth actuator. All L digital control signals are updated in this manner. Without interruption, the output sequencer 29 drives the actuators using the digital control signals $a_l(t_k)$ currently stored in the output memory 28.

FIGS. 3A–D form a flow diagram illustrating the preferred method of operation of an apparatus according to the invention. Briefly, the process of FIGS. 3A–D includes a start-up sequence in which the system is initialized, resulting in the application of control vibrations in the region or structure 11, followed by periodic execution of an update cycle in which the control vibrations are updated. Still briefly, the update cycle consists of sensing the sensed vibrations, decomposing the sensed vibrations, selecting the worst frequency components, obtaining transfer function matrices, calculating updates for the control vibrations, and updating the control vibrations to further the reduction of the sensed vibrations. The start-up sequence and update cycles are explained in detail with reference to FIGS. 3A–D in the following paragraphs.

The start-up sequence is begun by sensing the repetitive vibrations in the region or structure 11, decomposing the sensed vibrations into a set of frequency components S by performing FFTs, and storing the resulting amplitudes and phases (input complex amplitudes $p_m(n)$) of the frequency components in the central memory 26, preferably as carried out in the update cycle described hereinafter. The master processor 27 calculates a first estimate of the amplitudes and phases (output complex amplitudes $a_l(n)$) for the same set of frequency components S for each actuator 13 preferably in the same manner in which output complex amplitude updates $\Delta a_l(n)$ are calculated in the update cycle, which is described hereinafter. The output complex amplitudes $a_l(n)$ are stored in the central memory 26, and are used to compose the digital control signals $a_l(t_k)$ which are used to drive the actuators 13.

Figure 3A:
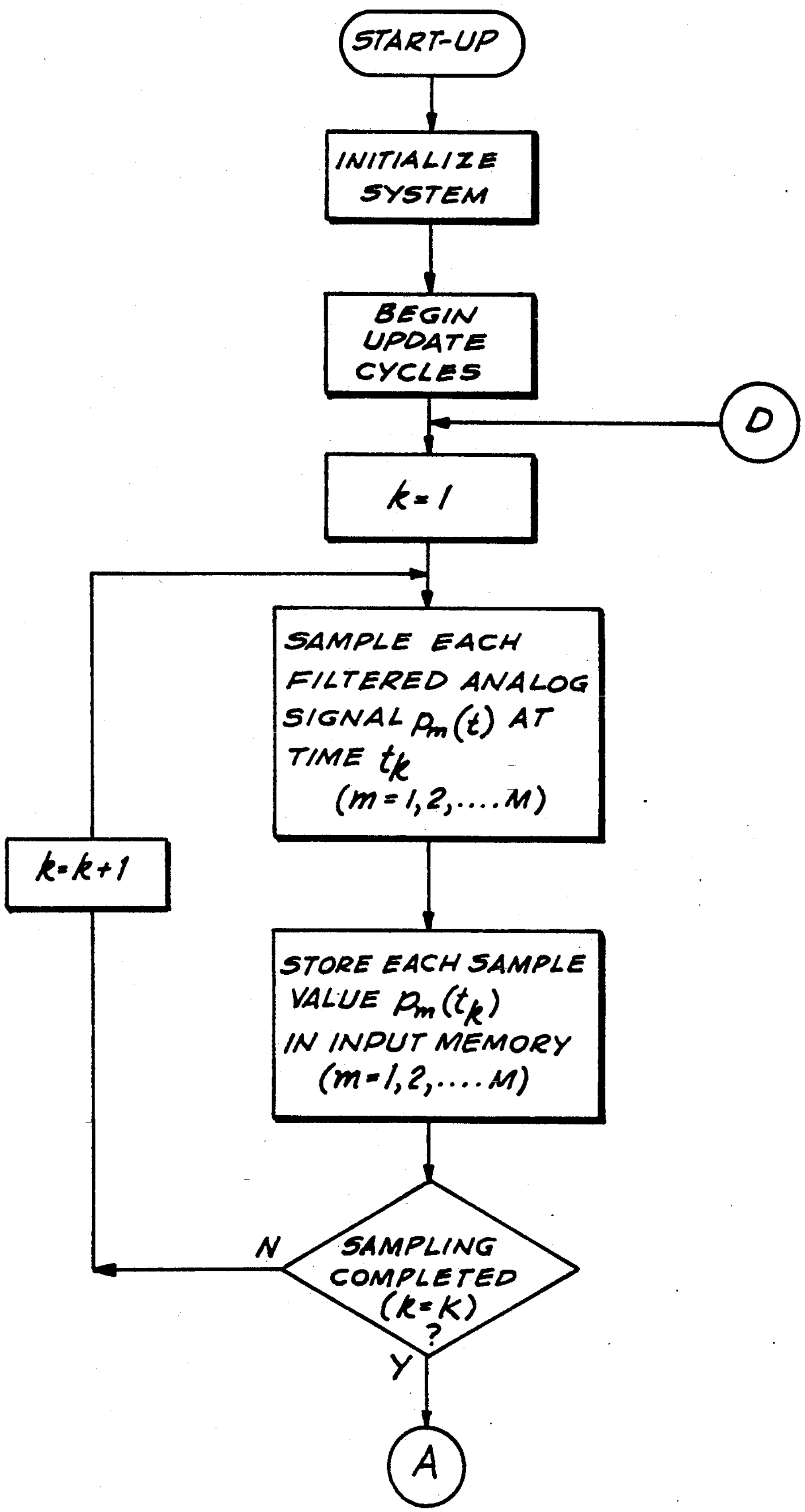
FIGS. 3A, 3B, 3C, and 3D form a composite flow diagram illustrating a method according to the invention for operating the apparatus illustrated in FIG. 2.
Figure 3B:
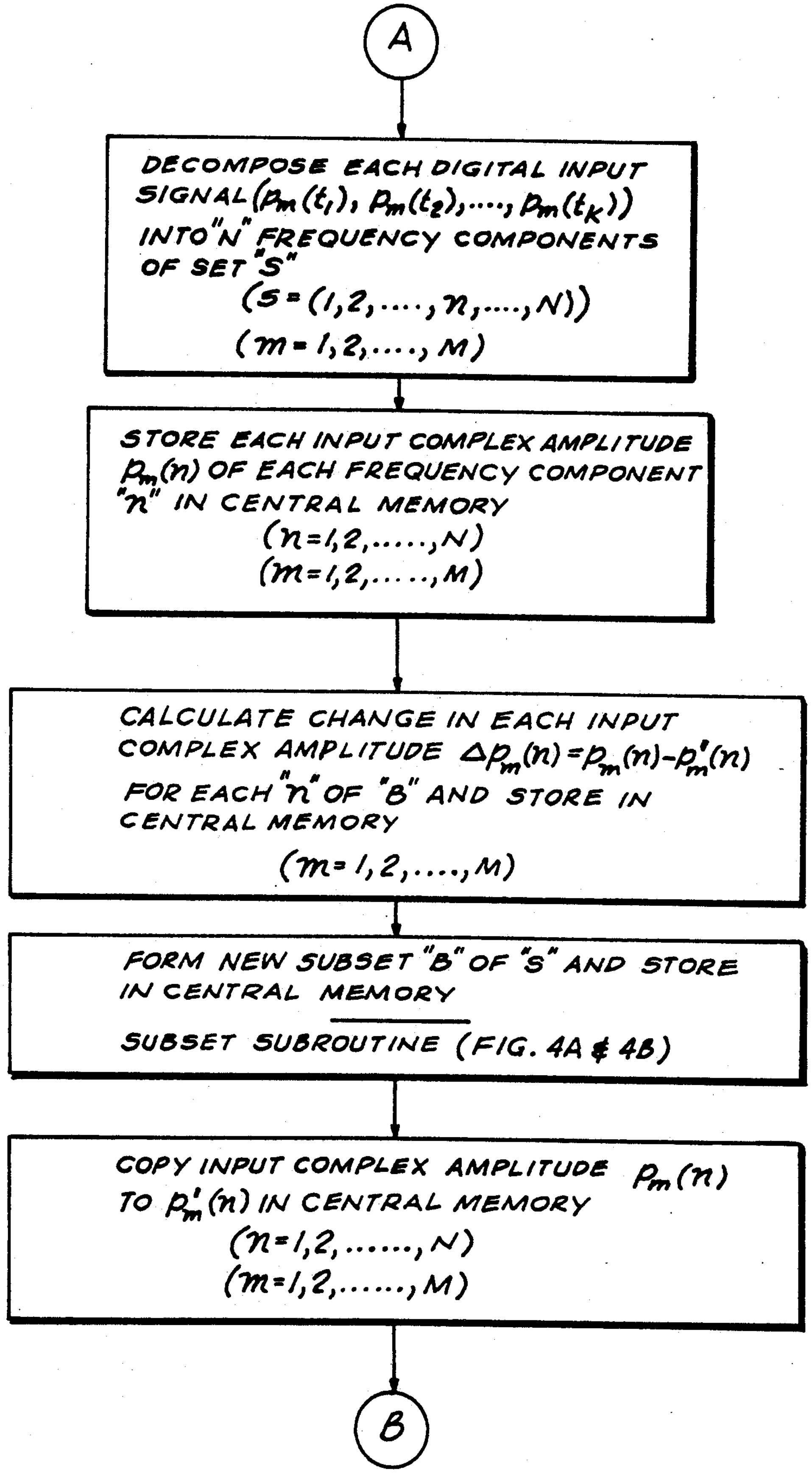

An update cycle is begun by sampling the filtered analog input signals $p_m(t)$ at K consecutive discrete times $t_k$, and storing the samples $p_m(t_k)$ in the input memory 24, as shown in FIG. 3A. k is initialized to 1. Each filtered analog input signal $p_m(t)$ is sampled at time $t_k$. Each sample value $p_m(t_k)$ is stored in the input memory 24. If the sampling is not completed, k is incremented by 1 and the sampling process is repeated for the next discrete time $t_k$. When K samples for each sensor have been obtained, the sampling process is completed and the update cycle continues as shown in FIG. 3B.

The input memory 24 now contains a digital input signal $p_m(t_k)$ for each sensor 14. For a particular m between 1 and M, the digital input signal $p_m(t_k)$ consists of K samples taken for the mth sensor 14. Each digital input signal $p_m(t_k)$ is decomposed into the N frequency components of the set S by the input system DSP 25 performing an FFT. FFTs are explained thoroughly in prior art, and are well known by those skilled in the signal processing art. The FFT performed on the digital input signal $p_m(t_k)$ of the mth sensor 14 produces N input complex amplitudes $p_m(n)$. For the mth sensor, the input complex amplitude $p_m(n)$ for a particular n between 1 and N is a complex number representing the amplitude and phase of the nth frequency component of the mth sensor's digital input signal $p_m(t_k)$. As will be readily appreciated by those skilled in the signal processing art, the nth frequency component is a sinusoidal function of a particular frequency, and for the mth digital input signal $p_m(t_k)$ having the amplitude and phase represented by the input complex amplitude $p_m(n)$. N input complex amplitudes $p_m(n)$ are obtained for each of the M sensors 14. The input complex amplitudes $p_m(n)$ are stored in the central memory 26.

The frequency components of set S are preferably the fundamental frequency of the repetitive vibrations produced by the repetitive vibration source 12 and the first $(N-1)$ harmonics thereof. The fundamental frequency of the repetitive vibrations is determined by the phase-locked loop 33. The synchronization signal produced by the phase-locked loop 33 is a timing signal with a frequency that is a multiple of the fundamental frequency of the repetitive vibrations. The synchronization signal is in phase with the repetitive vibrations produced by the repetitive vibration source 12. In addition to defining the frequency (fundamental frequency) of the repetitive vibrations, the synchronization signal is used to synchronize the operation of the sampling system 23 and the output sequencer 29. Each of the times $t_k$ are derived from the synchronization signal. Preferably, the K discrete times $t_k$ are equidistant discrete times that span one or more periods of the repetitive vibrations. The discrete times $t_k$ are in reference to a particular point in the period of the repetitive vibrations. If the frequency or phase of the repetitive vibrations vary, the discrete times $t_k$ will vary correspondingly.

Each update cycle a subset B is formed of the frequency components of set S. During the start-up sequence, the subset B is initialized to contain all the frequency components of set S. For each sensor 14, the change in the input complex amplitude $p_m(n)$ of each frequency component n of subset B is calculated in accordance with the following equations:

$$\Delta p_m(n) = p_m(n) - p'_m(n) \tag{1}$$

and the result stored in the central memory 26. In Equation 1 and the following equations, $p'_m(n)$ represents the input complex amplitude of the nth frequency component of the mth digital input signal $p_m(t_k)$ determined during the immediately preceding update cycle or during the start-up sequence if this is the first update cycle. $\Delta p_m(n)$ represents the change in the input complex amplitude.

A new subset B of the set of frequency components S is formed by the SUBSET subroutine of FIGS. 4A–B, described hereinafter. Each input complex amplitude $p_m(n)$ replaces the corresponding old input complex amplitude $p'_m(n)$ which is used in the succeeding update cycle.

Figure 3C:
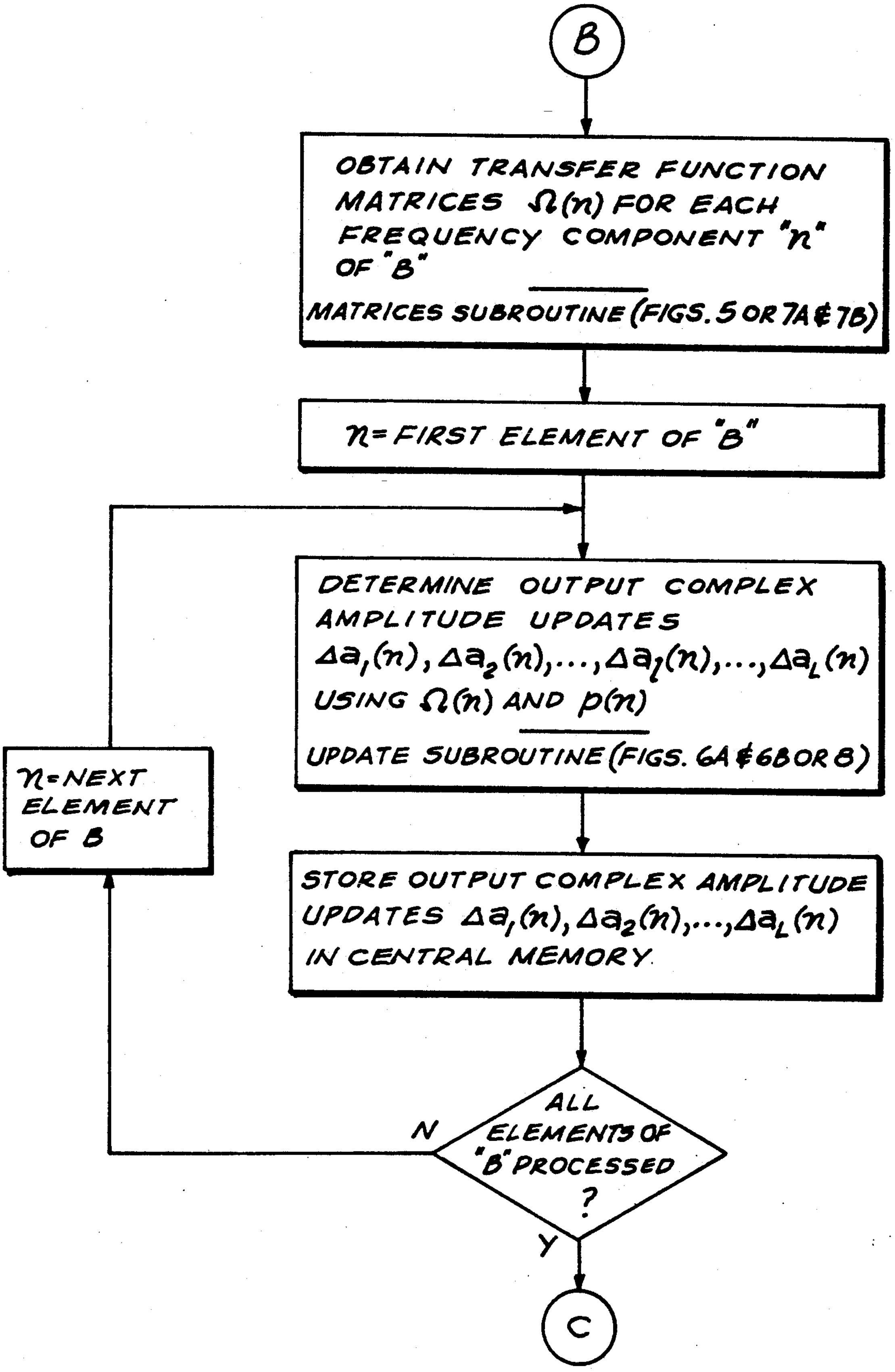

Output complex amplitude updates $\Delta a_l(n)$ are calculated as shown in FIG. 3C and are used to update the control vibrations. First, one or more transfer function matrices T(n) (the set of T(n) transfer function matrices are hereinafter referred to as $\Omega(n)$) are obtained for each frequency component n of subset B according to either the MATRICES subroutine shown in FIG. 5 or the MATRICES subroutine shown in FIGS. 7A–B, both of which are described hereinafter. Next, output complex amplitude updates $\Delta a_l(n)$ are sequentially calculated for each frequency component n of subset B using the transfer function matrices of set $\Omega(n)$. n is initialized to the first frequency component of subset B. For the particular component n, an output complex amplitude update $\Delta a_l(n)$ is obtained for each actuator 13 using either the UPDATE subroutine shown in FIGS. 6A-B or the UPDATE subroutine shown in FIG. 8, both of which are described hereinafter. As is also described hereinafter, the vector p(n) of input complex amplitudes is used in the determination of the L output complex amplitude updates $\Delta a_l(n)$, wherein:

$$p(n) = \begin{vmatrix} p_1(n) \\ p_2(n) \\ \cdot \\ \cdot \\ \cdot \\ p_M(n) \end{vmatrix} \quad (2)$$

Figure 3D:
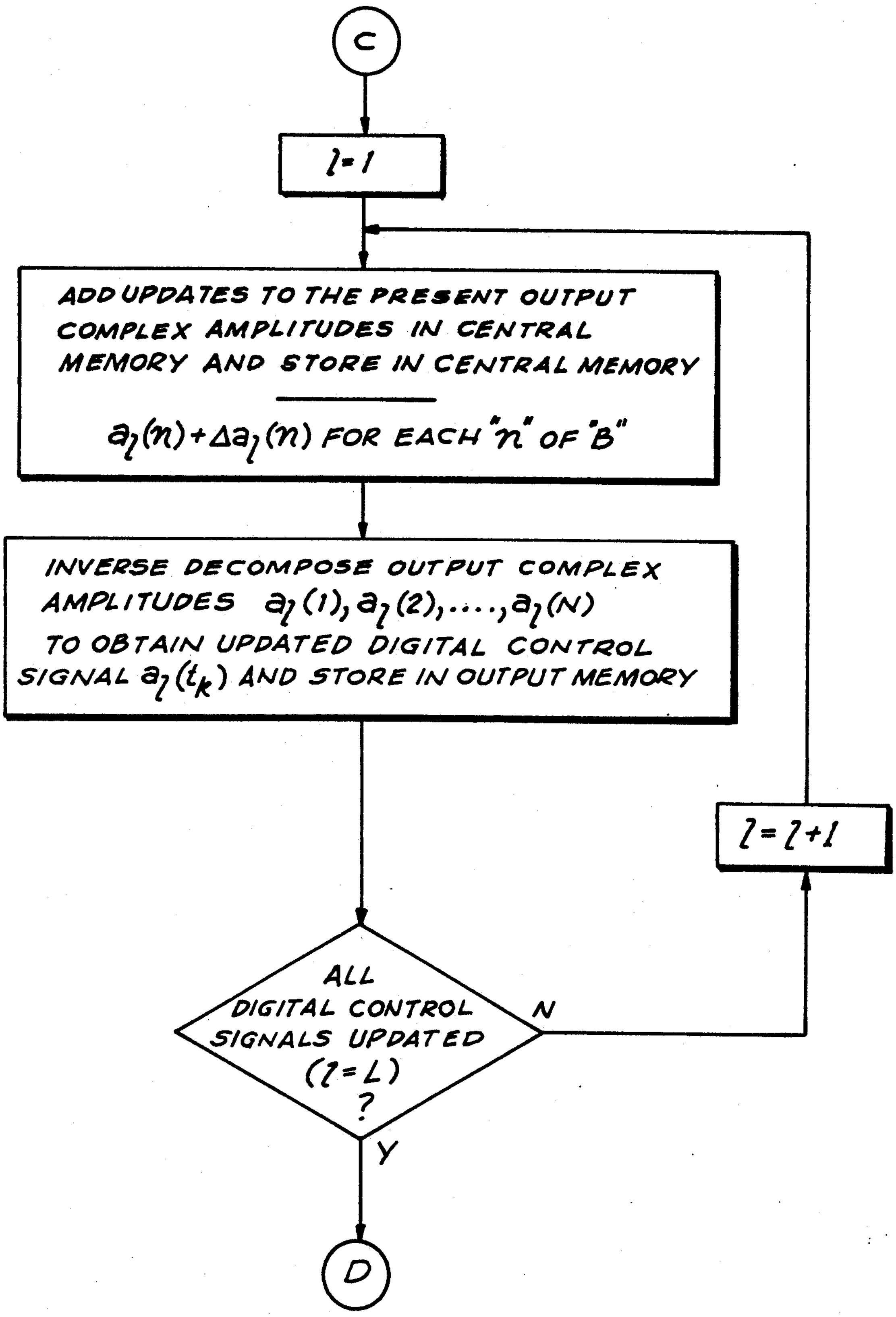

The L output complex amplitude updates $\Delta a_l(n)$ are stored in the central memory 26. If all the frequency components of subset B have not been processed, n is set equal to the next element of subset B and output complex amplitude updates $\Delta a_l(n)$ are determined for the frequency component n in the same manner. After all the elements of subset B are processed, the output complex amplitudes $a_l(n)$ are updated and corresponding digital control signals $a_l(t_k)$ are calculated as shown in FIG. 3D.

The digital control signal $a_l(t_k)$ for each actuator 13 is sequentially updated. l is initialized to 1. For the lth actuator, the output complex amplitudes $a_l(n)$ are updated by adding the output complex amplitude updates $\Delta a_l(n)$ to the corresponding output complex amplitudes $a_l(n)$ stored in the central memory 26. For each frequency component n of subset B, the output complex amplitude update $\Delta a_l(n)$ is added to the output complex amplitude $a_l(n)$ and the result is stored in the central memory:

$$a_l(n) + \Delta a_l(n) \rightarrow a_l(n) \quad (3).$$

The output complex amplitudes $a_l(n)$ corresponding to frequency components of set S that are not in subset B are unchanged. The output complex amplitudes $a_l(n)$ are then together inverse-decomposed by the output system DSP 31 by performing an inverse FFT. The result of the inverse FFT is the updated digital control signal $a_l(t_k)$. The digital control signal $a_l(t_k)$ consists of K digital values that together define the digital control signal at discrete times $t_1 - t_K$. The digital control signal $a_l(t_k)$ is stored in the output memory 28, superseding the present digital control signal $a_l(t_k)$ stored in the output memory.

If all the digital control signals $a_l(t_k)$ have not been updated in this manner, l is incremented by 1 and the digital control signal $a_l(t_k)$ for next actuator 13 is updated in the same manner. The process is repeated until all digital control signals $a_l(t_k)$ have been updated, after which the update cycle is completed. A new update cycle is then begun as shown in FIG. 3A.

The output sequencer 29 contemporaneously sequences through each digital control signal $a_l(t_k)$. At discrete time $t_k$, the output sequencer 29 converts the digital values, $a_l(t_k)$ for each l from 1 to L, to analog values which are applied in to the low-pass filters 30 and therefrom applied to the actuators 13. After the output sequencer 29 converts the last digital values of the digital control signals, $a_l(t_k)$ at discrete time $t_K$, the output sequencer begins sequencing through each digital control signal $a_l(t_k)$ starting with the digital values at discrete $t_1$, again. This process is continued without interruption.

While a method of utilizing the output complex amplitude updates $\Delta a_l(n)$ to update the digital control signals $a_l(t_k)$ is shown in FIGS. 3A-D, it will be appreciated that other methods could be used to obtain the same updated digital control signals. With the method shown in FIGS. 3A-D the output complex amplitude updates $\Delta a_l(n)$ are used to update the digital control signals in the frequency-domain and the results are inverse-decomposed to transform the result to the time-domain, giving the updated digital control signal $a_l(t_k)$. Rather than updating in the frequency-domain, the digital control signals could be updated in the time-domain. For example, the output complex amplitude updates $\Delta a_l(n)$ for the lth actuator could be inverse-decomposed by performing an inverse FFT to obtain a digital update signal $\Delta a_l(t_k)$. The digital update signal $\Delta a_l(t_k)$ would then be added to the digital control signal $a_l(t_k)$ currently stored in the output memory 28, thus updating the digital control signal $a_l(t_k)$. Following this alternative method, the resulting digital control signals would be no different than the digital control signals resulting from the method of utilizing the output complex amplitude updates shown in FIGS. 3A-D.

As discussed with reference to FIG. 3B, a new subset B of the set of frequency components S is formed in the update cycle. Preferably, the SUBSET subroutine shown in FIGS. 4A-B is used to form the subset B. The process shown in the flow diagram of FIGS. 4A-B results in a subset B containing fewer frequency components than in set S. The input complex amplitude $p_m(n)$ of greatest magnitude is sequentially determined for each frequency component n of set S. As mentioned previously, an input complex amplitude $p_m(n)$ is a complex number representing the phase and amplitude of a frequency component. The input complex amplitude $p_m(n)$ can be represented in exponential form as follows:

$$p_m(n) = \lambda_m(n) e^{j\theta_m(n)} \quad (4).$$

where $\theta_m(n)$ and $\lambda_m(n)$ are respectively the phase and amplitude of the nth frequency component of the mth digital input signal $p_m(t_k)$: e is the natural logarithm base and j is square-root of $-1$. Mathematically, $\lambda_m(n)$ is the magnitude of the input complex amplitude $p_m(n)$, and will be referred to as such hereinafter. The greatest magnitude of the input complex amplitudes $p_m(n)$ of the nth frequency component is denoted as $\lambda_{max}(n)$ and is mathematically defined as follows:

$$\lambda_{max}(n) = \text{MAX}(\lambda_m(n)) \text{ for } m = 1, 2, \ldots, M \quad (5).$$

Also, the greatest change in the magnitude of the input complex amplitudes $p_m(n)$ of the nth frequency component is denoted $\Delta\lambda_{max}(n)$ and is mathematically defined as follows:

$$\Delta\lambda_{max}(n) = \text{MAX } |\lambda_m(n) - \lambda'_m(n)| \text{ for } m = 1, 2, \ldots, M \quad (6).$$

$\lambda'_m(n)$ is the magnitude of the input complex amplitude $p'_m(n)$ of the nth frequency component of the mth digital input signal sensed in the immediately preceding update cycle.

Figure 4A:
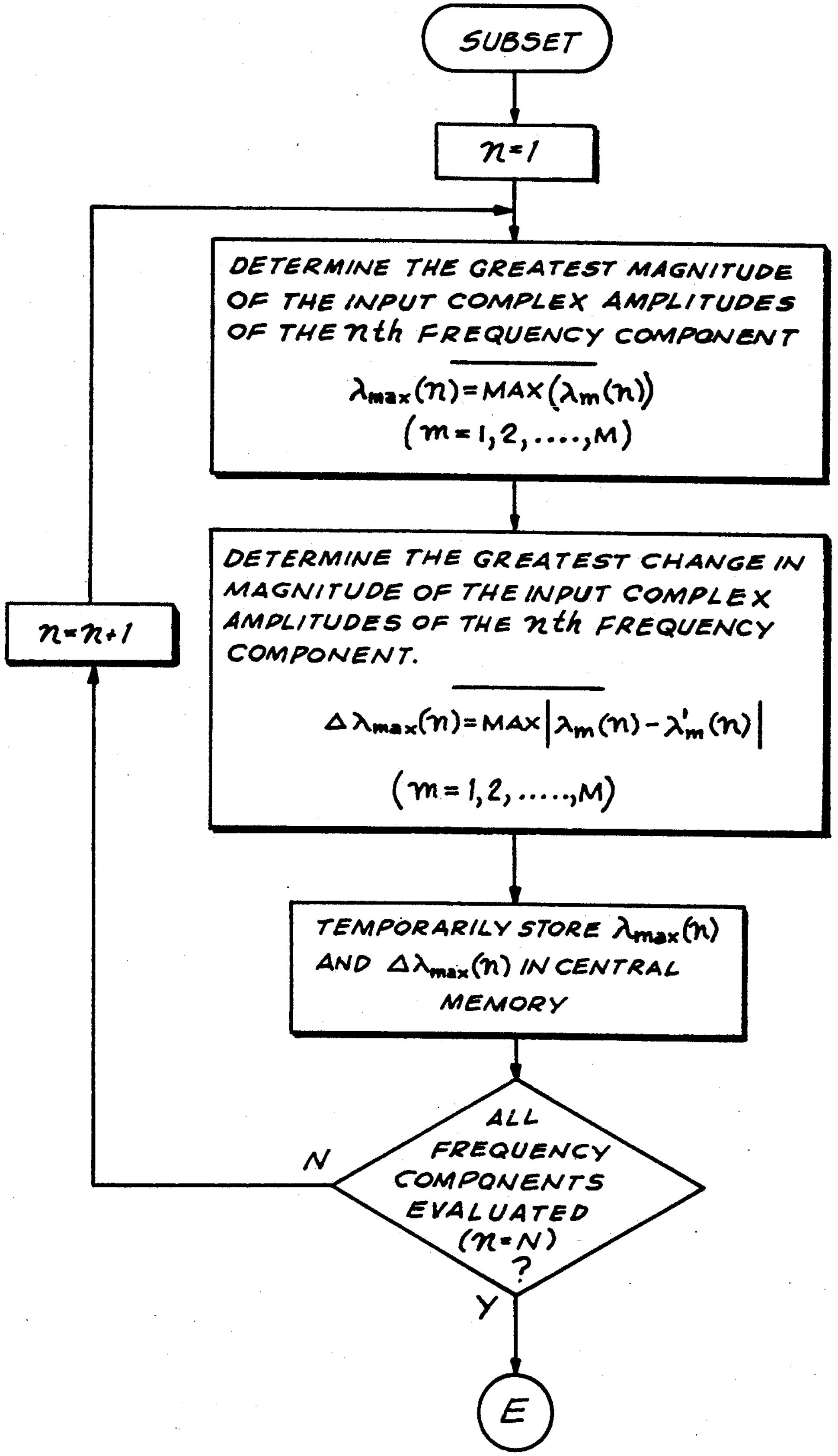
FIGS. 4A and 4B form a composite flow diagram of a SUBSET subroutine suitable for use in the method of FIG. 3B.

The process in FIG. 4A processes each frequency component sequentially. n is initialized at 1. The greatest magnitude $\lambda_{max}(n)$ and the greatest change in magnitude $\Delta\lambda_{max}(n)$ of the nth frequency component are determined and temporarily stored in the central memory 26. This process is sequentially repeated for succeeding frequency components until all frequency components of set S are evaluated.

Figure 4B:
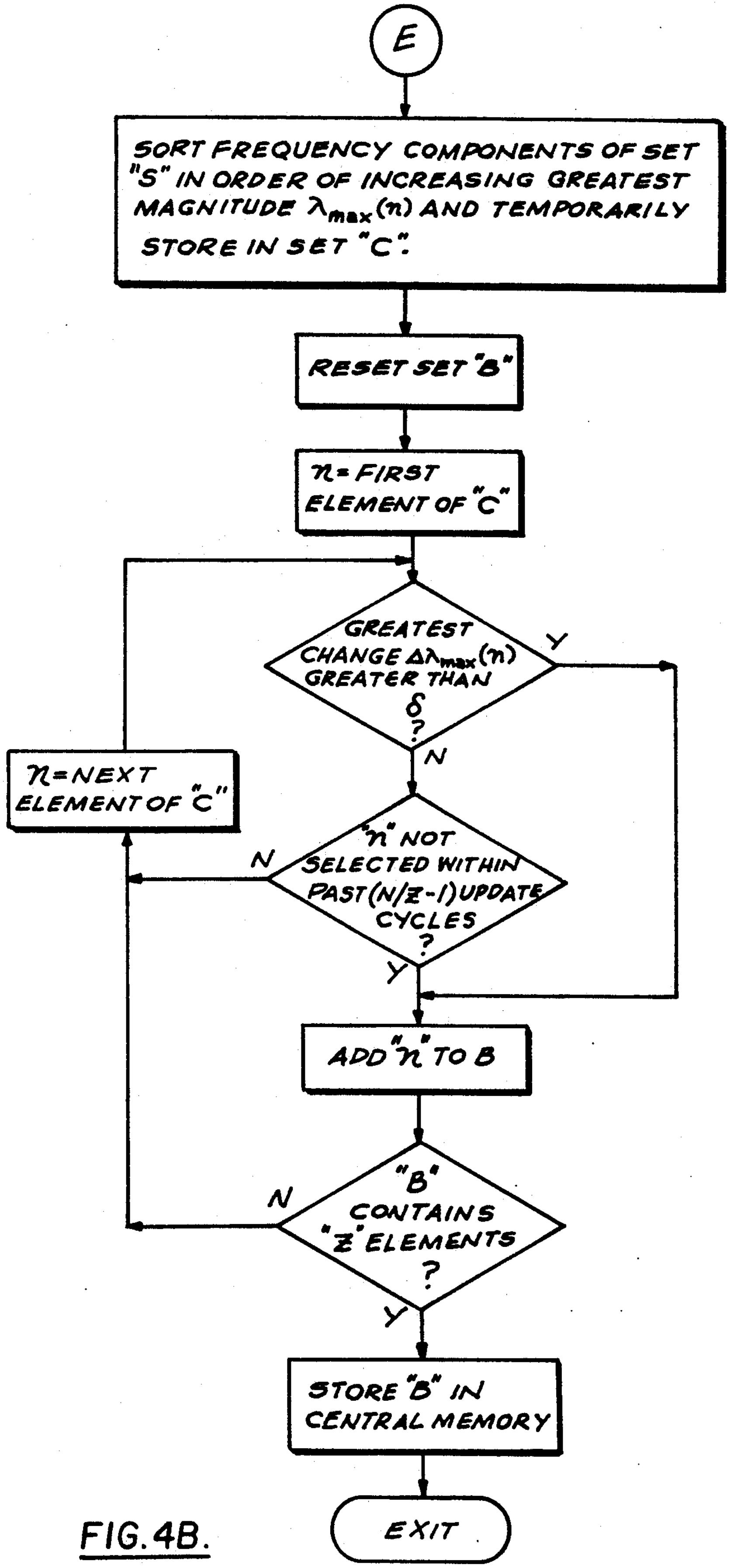

The SUBSET subroutine continues as shown in FIG. 4B. The frequency components of set S are sorted in order of increasing greatest magnitude $\lambda_{max}(n)$ and the result is temporarily stored as set C in central memory 26. The set B is reset so as to contain no frequency components. A new subset B is then formed as the first Z (quantity) frequency components of sorted set C satisfying additional criteria. The additional criteria prevent repeatedly selecting a frequency component that has a large greatest magnitude $\lambda_{max}(n)$, but which is minimized, and ensures that all frequency components are selected in steady-state conditions. n is initialized to the first element of sorted set C. The first criterion is applied to the greatest change in magnitude $\Delta\lambda_{max}(n)$. If the greatest change in magnitude $\Delta\lambda_{max}(n)$ is greater than $\delta$, the frequency component n is added to the subset B. Otherwise, the second criterion is applied to the frequency component n. If the frequency component n has not been selected within the past $N/Z-1$ (quantity) update cycles, then the frequency component n is added to the subset B. If both criteria fail, n is set equal to the next frequency component of sorted set C, and the two criteria are then applied in the same manner to the frequency component n. After adding a frequency component n to subset B, a test is applied. If B does not contain Z frequency components, n is set equal to the next frequency component of sorted set C, and the two criteria are applied to the frequency component n in the same manner. Otherwise, after adding a frequency component n to subset B, the subset B is stored in central memory 26 and the SUBSET subroutine is thus completed.

The number Z of frequency components in subset B is less than the number N of frequency components in set S, so that the number of frequency components that must be processed in the remainder of the update cycle is reduced and thereby the processing time of the update cycle is reduced. For example, 32 frequency components could be included in set S while only 8 of those frequency components could be included in subset B.

While the preferred SUBSET subroutine is shown in FIGS. 4A–B, it will be appreciated that various other subroutines could be used without departing from the spirit of the invention, which is to form a subset B of set S. For example, in lieu of the greatest magnitude $\lambda_{max}(n)$, the weighted root mean square (RMS) of the magnitudes of the input complex amplitudes $p_m(n)$ of the frequency component n could be used. Similarly, in lieu of the greatest change in magnitude $\Delta\lambda_{max}(n)$, the weighted RMS of change in the magnitudes $\lambda_m(n)$ of the input complex amplitudes $p_m(n)$ of the frequency component n could be used. The frequency components selected would then be the frequency components with the greatest weighted RMS of the magnitudes of the input complex amplitudes, subject to criteria based upon the weighted RMS of the changes in the magnitudes of the input complex amplitudes. Additionally, criteria other than those shown in FIG. 4B could be used, depending on the requirements of the frequency-domain vibration controller.

Figure 5:
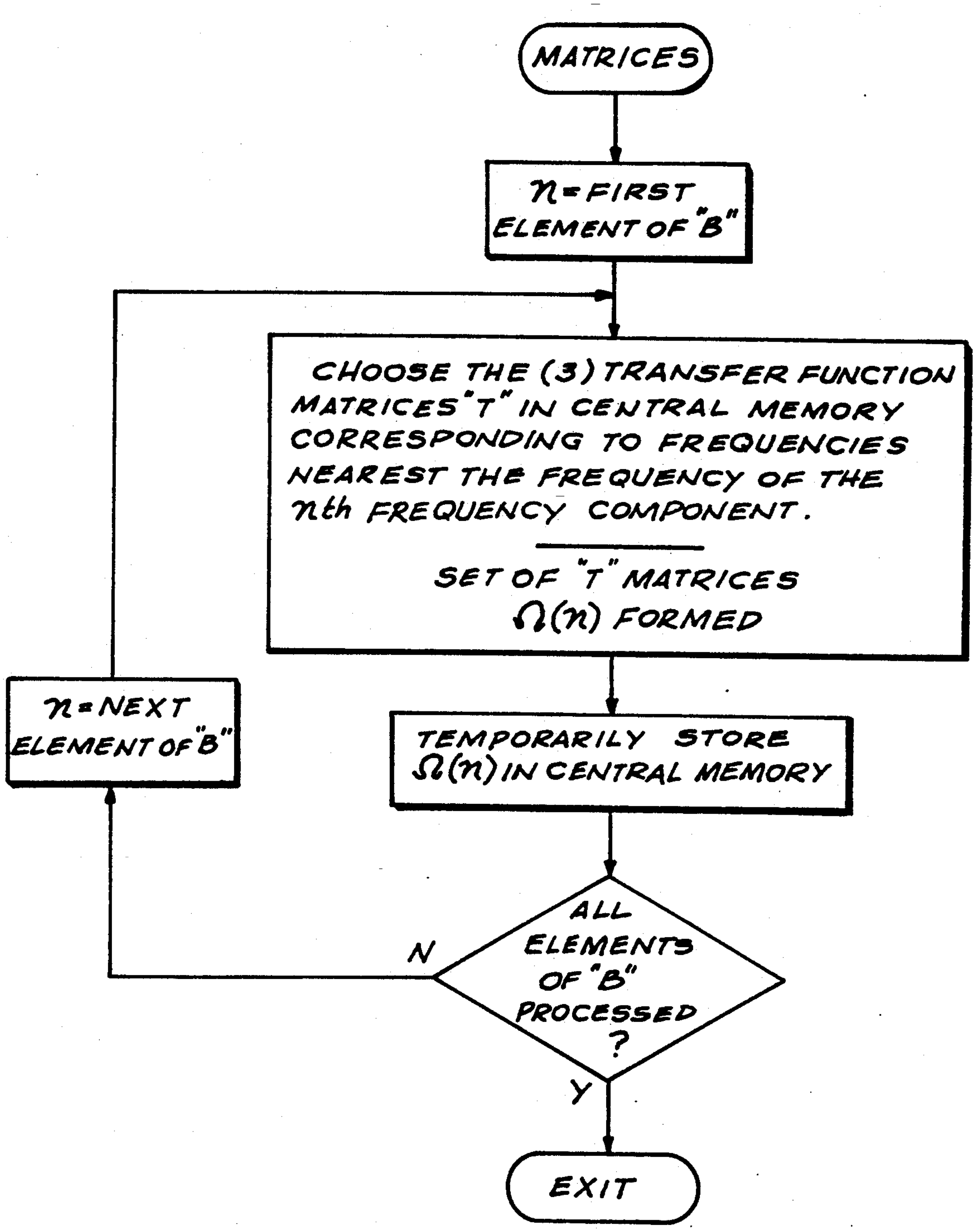
FIG. 5 is a flow diagram of a MATRICES subroutine suitable for use in the method of FIG. 3C.

In FIG. 3C, the output complex amplitude updates $\Delta a_l(n)$ of each frequency component of subset B are determined. First, the set $\Omega(n)$ of transfer function matrices T(n) for each frequency component n of subset B are obtained. FIG. 5 provides a flow diagram of a preferred method of obtaining the transfer function matrices T(n). The transfer function matrix T(n) relates a change in the control vibrations to the change in the sensed vibrations in the absence of other changes according to the following equation:

$$\Delta p(n) = T(n)\Delta a(n) \quad (7).$$

$\Delta a(n)$ is an L-by-1 vector wherein the lth row is the output complex amplitude update $\Delta a_l(n)$, which represents the change in the complex amplitude of the nth frequency component of the lth digital control signal $a_l(t_k)$. $\Delta p(n)$ is an M-by-1 vector wherein the mth row is the change in the input complex amplitude $p_m(n)$. T(n) is an M-by-N matrix of complex numbers. Equation (6) give the changes $\Delta p(n)$ in the input complex amplitudes $p_m(n)$ that will occur following updating the digital control signals $a_l(t_k)$ in accordance with the output complex amplitude updates $\Delta a_l(n)$ of vector $\Delta a(n)$. Equation (7) will be readily recognized by those skilled in the signal processing and control system arts to be a matrix transfer function equation. Further, the determination of a transfer function matrix T(n) can be done in several ways well known by those skilled in the signal processing and control system arts.

The MATRICES subroutine shown in the flow diagram of FIG. 5 sequentially selects three transfer function matrices T(n) for each frequency component of subset B. The matrices are previously determined in any of several ways and are stored in the central memory 26. The MATRICES subroutine of FIG. 5 begins by initializing n to the first frequency component of subset B. The three transfer function matrices T(n) corresponding to frequencies nearest the frequency f(n) of the nth frequency component are selected from central memory 26. The so-selected matrices form the set $\Omega(n)$ containing three transfer function matrices T(n). Preferably, the set $\Omega(n)$ contains pointers to the three transfer function matrices T(n) selected. The set $\Omega(n)$ is temporarily stored in the central memory 26. This process is sequentially repeated for succeeding frequency components of subset B until three transfer function matrices are selected for each frequency component of subset B.

Figure 6A:
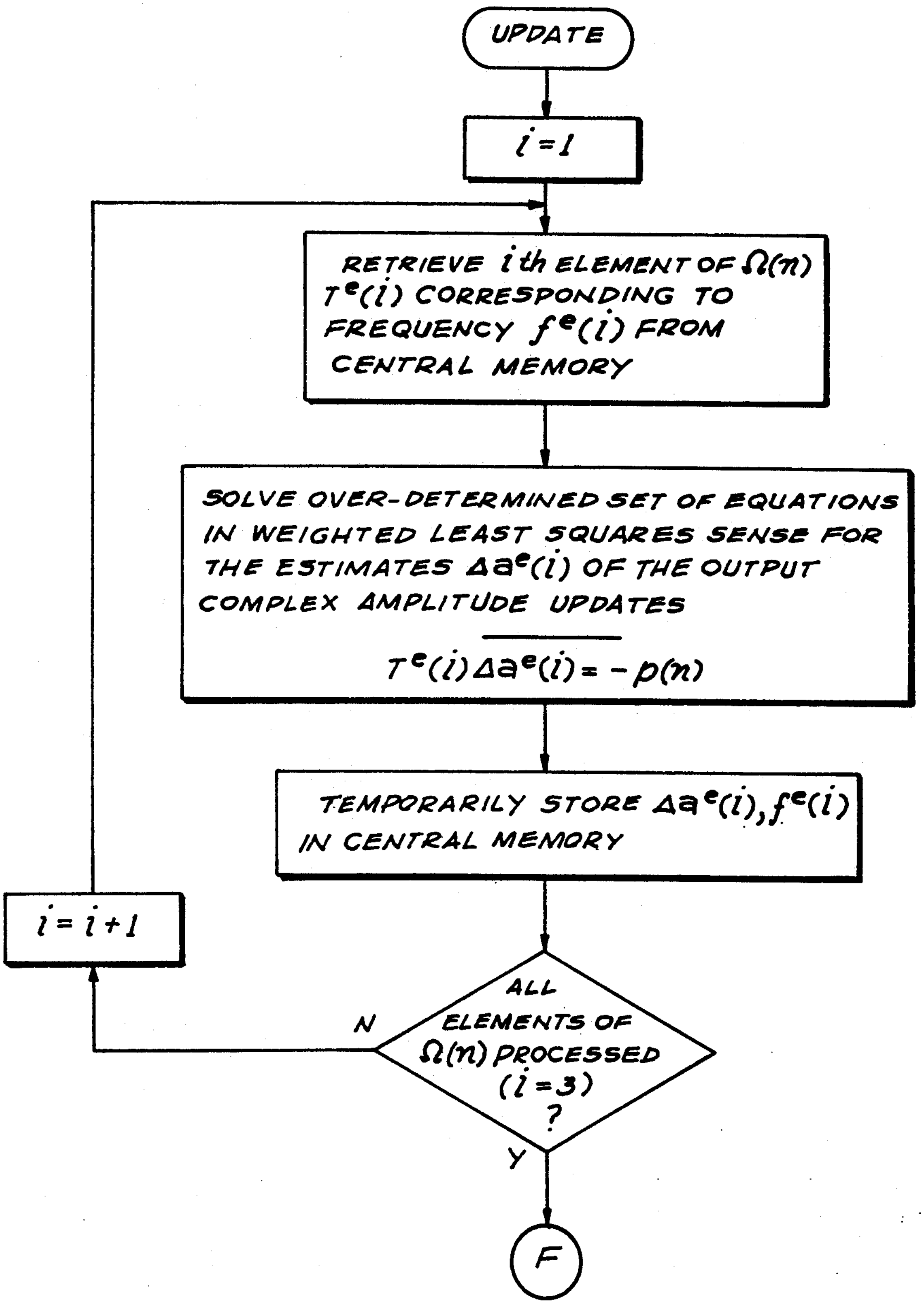
FIGS. 6A and 6B form a composite flow diagram of an UPDATE subroutine suitable for use in the method of FIG. 3C.
Figure 6B:
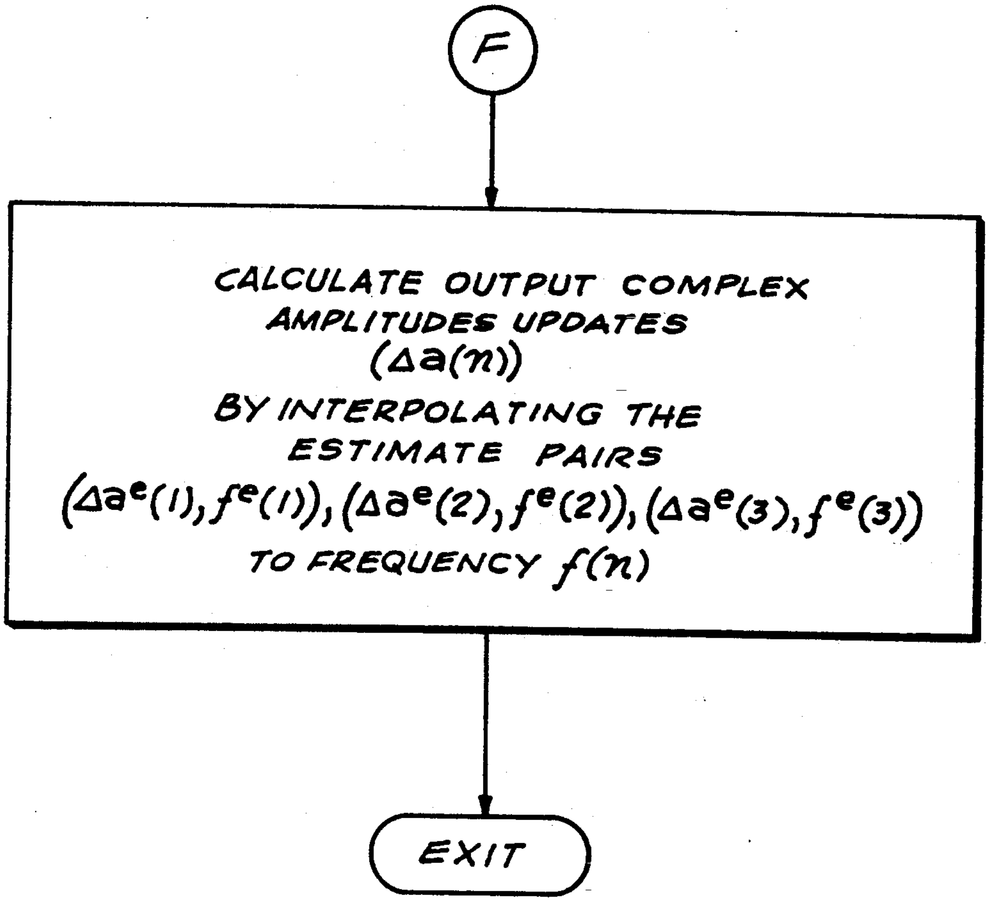

Various parameters of the region or structure 11, the apparatus used to carry out the method of the invention, or the repetitive vibrations produced by the repetitive vibration source 12 can vary. These parameter changes can change the actuator-to-sensor response characteristics that are modeled by the transfer function matrices. In order for the update cycles to effectively update the digital control signals $a_l(t_k)$ so that the control vibrations further reduce the repetitive vibrations or maintain the reduction of the repetitive vibrations, the transfer function matrices T(n) must relatively accurately model the actuator-to-sensor response characteristics. If the parameters that are probable to change and cause significant change in the actuator-to-sensor response characteristics are relatively small in number, then transfer function matrices T(n) modeling the actuator-to-sensor response characteristics under various parameter combinations can be prestored in the central memory 26. In operation, output complex amplitude updates $\Delta a_l(n)$ would be calculated using the transfer function matrices T(n) corresponding to parameter combinations near the actual combination. In such applications, the MATRICES and UPDATE subroutines used as shown in FIG. 3C are preferably a MATRICES subroutine similar to the MATRICES subroutine shown in FIG. 5 and a UPDATE subroutine similar to the UPDATE subroutine shown in FIGS. 6A–B, which is described hereinafter. The MATRICES and UPDATE subroutines respectively shown in FIG. 5 and FIGS. 6A–B are preferably applied in applications in which the only probable parameter change causing significant change in the actuator-to-sensor response characteristics is the frequency f(n) of the nth frequency component. The frequency f(n) is dependent upon the frequency of the repetitive vibrations produced by the repetitive vibration source 12. In most instances, f(n) will be the fundamental frequency of the repetitive vibrations, or a multiple of the fundamental frequency.

In other applications, several parameters of the repetitive vibrations, the region or structure 11, or the apparatus used to carry out the method of the invention change and cause significant change in the actuator-to-sensor response characteristics. In such applications, it is impractical to preconsider all probable parameter changes and prestore transfer function matrices corresponding to each of these combinations. Rather, in such applications, an adaptive method of updating the digital control signals $a_l(t_k)$ is preferably used. Used in conjunction with the method of FIGS. 3A–D, the combination of the MATRICES subroutine shown in FIGS. 7A–B and the UPDATE subroutine shown in FIG. 8 provide this type of adaptive method and are described herein.

Returning now to the description of the combination of the MATRICES and UPDATE subroutines respectively shown in FIG. 5 and FIGS. 6A–B, the UPDATE subroutine shown in FIGS. 6A–B begins by sequentially calculating an estimate of output complex amplitude updates for each of the transfer function matrices in the set $\Omega(n)$ corresponding to the particular frequency component n. The output complex amplitude updates are then calculated by interpolating the estimates of the output complex amplitude updates. In the flow diagram of FIG. 6A, i is initialized to 1. The transfer function matrix $T^e(i)$ referenced by the ith element of $\Omega(n)$ is retrieved from the central memory 26. The transfer function matrix $T^e(i)$ corresponds to the actuator-to-sensor response characteristics of the frequency component having a frequency $f^e(i)$ that is near the frequency f(n) of the nth frequency component.

The estimate of the output complex amplitude updates corresponding to the transfer function matrix $T^e(i)$ is calculated such that according to the actuator-to-sensor response characteristics modeled by the transfer function matrix $T^e(i)$, the sensed vibration amplitudes of the nth frequency component will be minimized if the digital control signals are updated according to the output complex amplitude updates estimated. The calculation is formally carried out in accordance with the following equation:

$$(T^e(i))^{T^*}U(i)T^e(i)\Delta a^e(i) = -(T^e(i))^{T^*}U(i)p(n) \quad (8).$$

U(i) is an M-by-M diagonal matrix of scalars which can be used to weight the importance of the reduction of the frequency component n at each sensor location m, as is described hereinafter. Further in Equation (8), the L-by-1 vector $\Delta a^e(i)$ contains the output complex amplitude update estimates. The complex number $\Delta a^e_l(i)$ is the lth row of the vector $\Delta a^e(i)$, and represents the estimate of the output complex amplitude update $\Delta a_l(n)$. The superscript T* denotes the complex conjugate transpose operation. Equation (8) is solved for the vector $\Delta a^e(i)$ of complex amplitude updates and the so-calculated estimate represents the weighted least squares solution to the following matrix transfer function equation:

$$T^e(i)\Delta a^e(i) = -p(n) \quad (9).$$

If the transfer function matrix $T^e(i)$ modeled the actuator-to-sensor response characteristics of the nth frequency component exactly, the output complex amplitude updates $\Delta a^e_l(i)$, if used to update the digital control signals, would minimize the amplitudes of the sensed vibrations nth frequency component. This will be readily appreciated by those skilled in the control systems art when referring to Equation (7). In reference to Equation (7), the estimate in the output complex amplitude updates $\Delta a^e(i)$ in Equation (9) corresponds to the output complex amplitude updates $\Delta a(n)$ in Equation (7), the transfer function matrix $T^e(i)$ corresponds to the transfer function matrix T(n) in Equation (7), and $-p(n)$ in Equation (9) corresponds to the change in the input complex amplitudes $\Delta p(n)$ in Equation (7). Therefore, if the transfer function matrix $T^e(i)$ were exact, updating the digital control signals using the output complex amplitude updates $\Delta a^e(i)$ would result in a change in the input complex amplitudes of the nth frequency component that minimizes that frequency component. However, the transfer function matrix $T^e(i)$ corresponds to a frequency $f^e(i)$ somewhat different in value than the frequency f(n) of the nth frequency component, and thus the output complex amplitude updates $\Delta a^e(i)$ are an estimate of the output complex amplitude updates that would minimize the frequency component of the sensed vibrations.

As mentioned previously, the number M of sensors 14 is greater than the number L of actuators 13. In absence of this preferred relationship between the number of sensors 14 and the number of actuators 13, the frequency-domain vibration controller would probably produce control vibrations that produce a nearly complete reduction of the repetitive vibrations at each sensor 14 location, but possibly insignificant reduction of the repetitive vibrations at locations in the region or structure 11 other than the locations of the sensors 14. As a result, the matrix Equation (9) represents M linear equations in L unknowns; the number of equations is greater than the number of unknowns. No exact solution exists to the overdetermined set of equations represented by the matrix Equation (9). The matrix Equation (9) is therefore solved in a weighted least squares sense, i.e., the solution $\Delta a^e(i)$ which best satisfies the matrix Equation (9) is obtained. Solving overdetermined matrix equations in a weighted least squares sense is well known to those skilled in the linear algebra art and detailed descriptions of such solutions can be found in various reference materials pertaining to that art. The following paragraphs will briefly describe the solution to an overdetermined set of equations solved in a weighted least squares sense.

The solution of an overdetermined matrix equation will be described with reference to the following equation:

$$Ax = y \quad (10).$$

A is a M-by-L matrix of complex numbers; x is a L-by-1 vector of complex numbers; and y is M-by-1 vector of complex numbers. Matrix Equation (10) is overdetermined, since the number M of equations is greater than the number L of unknowns contained in the vector x. Since no vector x that exactly satisfies Equation (10) exists, such equations are commonly solved in a weighted least squares sense. Conceptually, solving the matrix Equation (10) in the weighted least squares sense produces the vector x, such that the product of the matrix A and the vector x produces a vector $y^*$ as close to the vector y as possible. As is well known to those skilled in the art, the weighted least squares solution to Equation (10) is formally found by solving the following matrix equation:

$$A^{Tr}WAx = A^{Tr}Wy \quad (11).$$

The matrix W is a diagonal matrix of scalars that can be used to weight the importance of each element of the vector y. Equation (11) can be solved for the vector x with numerous well-developed and documented algorithms for solving linear matrix equations. If each of the elements of the vector y is considered of equal importance, then the diagonal elements of the matrix W would be chosen to be equal. Equations (8) represents the weighted least squares solution to Equation (9) just as Equation (11) represents the weighted least squres solution to Equation (10).

As will be readily appreciated by those skilled in the linear algebra art, equations of the form of Equation (11) are generally solved in two steps: matrix decomposition and back substitution. The matrix decomposition can comprise, for example, QR decomposition. In Equation (11), the matrix that would be decomposed is the matrix WA. Similarly, the matrix $U(i)T^e(i)$ would be decomposed to solve Equation (8) for the vector $\Delta a^e(i)$. If the matrix $U(i)T^e(i)$ in Equation (8) is constant, preferably, the matrix is stored in decomposed form, in addition to storing the transfer function matrix $T^e(i)$ explicitly. Then the solution to Equation (8) is obtained by performing back substitution, avoiding the computationally intensive step of matrix decomposition.

Continuing with FIG. 6A, the solution $\Delta a^e(i)$ and the frequency $f^e(i)$ are stored temporarily in the central memory 26. i is then incremented by 1 and the process is repeated to calculate the second estimate of the output complex amplitude updates $\Delta a^e(i)$ with the transfer function matrix $T^e(i)$ corresponding to the frequency $f^e(i)$, and the results are stored in the central memory 26. This process is repeated until all the matrices referenced by the set $\Omega(n)$ are processed, i.e., all three transfer function matrices are used.

The vector $\Delta a(n)$ of output complex amplitude updates is then calculated by interpolating the three estimate pairs, $(\Delta a^e(1),f^e(1))$, $(\Delta a^e(2),f^e(2))$, $(\Delta a^e(3),f^e(3))$. A quadratic interpolation to the frequency f(n) of the nth frequency component is performed. Performing a quadratic interpolation is well known. Conceptually, performing a quadratic interpolation involves obtaining the unique quadratic equation that satisfies the three abscissa-ordinate pairs, and then solving the quadratic equation for the ordinate corresponding to a particular abscissa. In the application at hand, frequency is the abscissa and the output complex amplitude updates are the ordinates.

The method of FIGS. 3A–D used in conjunction with the MATRICES and UPDATE subroutines, respectively shown in FIG. 5 and FIGS. 6A–B, utilizes prestored transfer function matrices corresponding to various frequencies such that the update cycle can be effective for various and changing frequencies of the repetitive vibrations. However, it will be appreciated that substantially the same method can be used for other varying parameters that affect the actuator-to-sensor response characteristics. For example, in the application of the present invention to reducing repetitive noise in aircraft cabins, the actuator-to-sensor response characteristics may vary significantly with the atmospheric pressure of the cabin as well as the frequency of the repetitive vibrations. In this example, transfer function matrices would be stored for various frequency-pressure value pairs, and output complex amplitude updates would be calculated by interpolating the result obtained with several transfer function matrices with frequency-pressure values near the actual values. Still further, the transfer function matrices stored in the central memory 26 could be periodically modified as a result of some process.

Further, the UPDATE subroutine shown in FIGS. 6A–B calculates the vector $\Delta a(n)$ of output complex amplitude updates by interpolating three estimate pairs. However, it will be appreciated that substantially the same method can be used with a different number of estimate pairs. For example, two estimate pairs could be calculated and the results linearly interpolated to obtain the output complex amplitude updates.

As mentioned previously, the method of calculating output complex amplitude updates shown in FIG. 5 and FIGS. 6A–B is preferable when only a few parameters that significantly affect the actuator-to-sensor response characteristics are likely to change. However, in other applications several parameters significantly affecting the actuator-to-sensor response characteristics are likely to change. In such applications, it is impractical to preconsider all probable parameter changes and prestore transfer function matrices corresponding to each of these combinations. Rather, in such applications, an adaptive method of updating the digital control signals is preferred. Used in conjunction with the method of FIGS. 3A–B, the combination of the MATRICES subroutine shown in FIGS. 7A–B and the UPDATE subroutine shown in FIG. 8 provides this type of adaptive method.

In this adaptive method, a transfer function matrix T(n) is stored in the central memory 26 for each of the frequency components of set S. Before one of the transfer function matrices T(n) is used to calculate a vector $\Delta a(n)$ of output complex amplitude updates, the transfer function matrix T(n) is updated based upon the most recently observed actuator-to-sensor response characteristics exhibited by the nth frequency component. The updating of a transfer function matrix T(n) is performed by the MATRICES subroutine shown in FIGS. 7A–B.

Figure 7A:
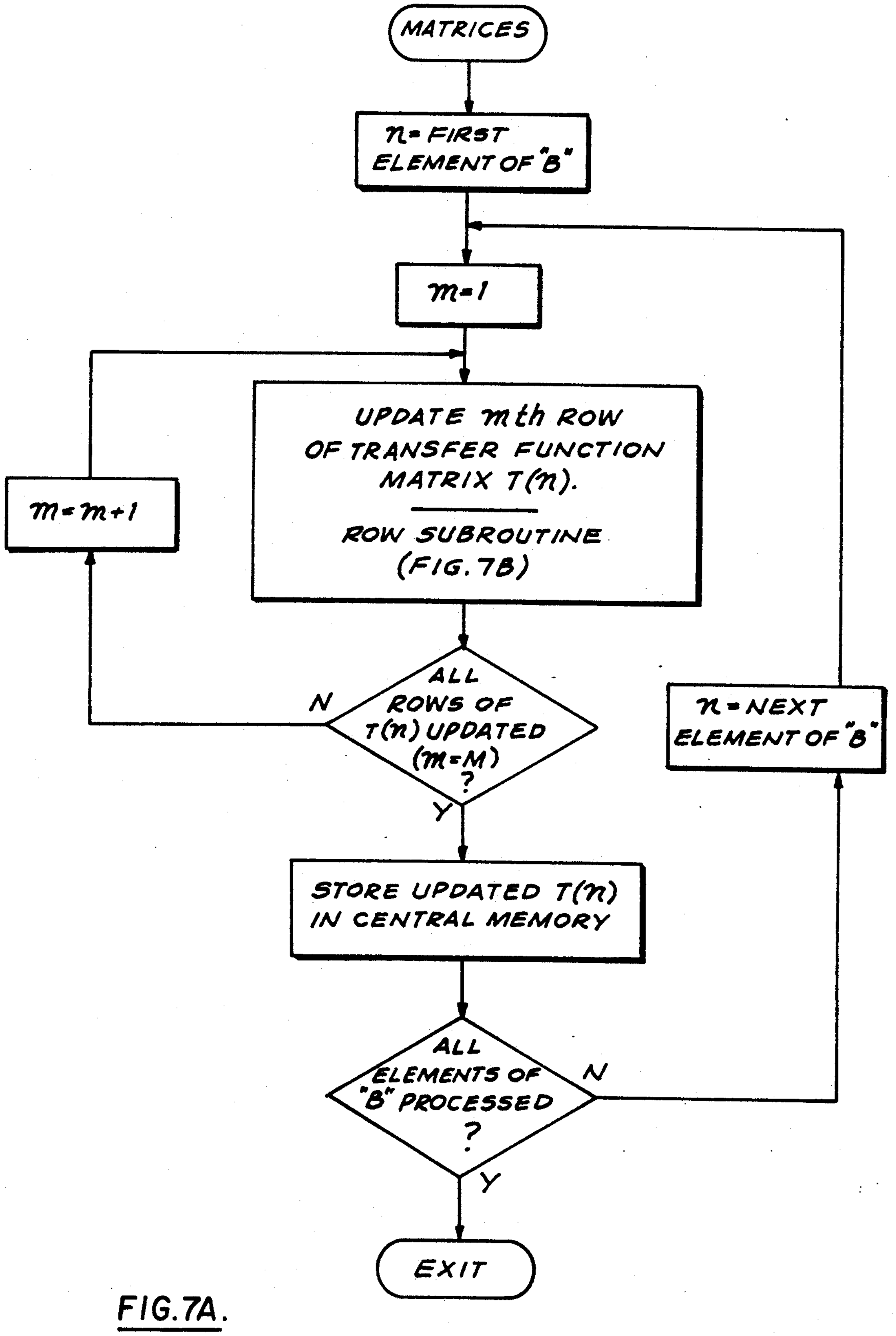
FIGS. 7A and 7B form a composite flow diagram of an alternative MATRICES subroutine suitable for use in the method of FIG. 3C.

As shown in FIG. 7A, n is initialized to the first frequency component of the subset B. Sequentially, each row of the transfer function matrix T(n) corresponding to the nth frequency component are updated. m is initialized to 1 and the first row of the transfer function matrix T(n) is updated according to the ROW subroutine shown in FIG. 7B, and described hereinafter. Subsequent rows of the transfer function matrix T(n) are sequentially updated with the same process until all rows of the transfer function matrix T(n) have been updated. The updated transfer function matrix T(n) is then stored in the central memory 26. If there are additional frequency components in the subset B, n is assigned the next frequency component of subset B, and the transfer function matrix T(n) corresponding to the frequency component is updated row-by-row in the same manner. This process is sequentially repeated until the transfer function matrix T(n) corresponding to each frequency component of subset B has been updated.

Figure 7B:
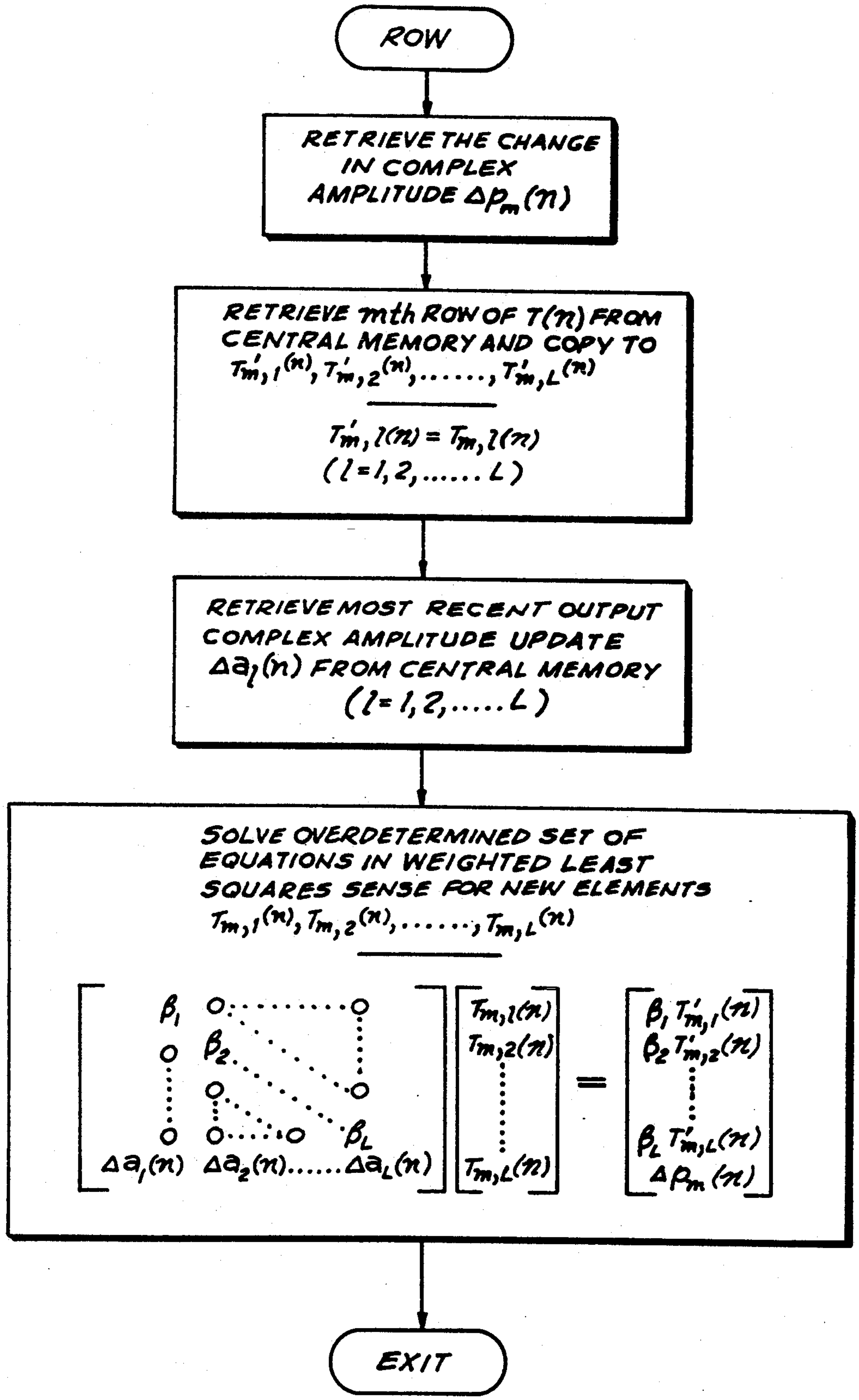
Figure 8:
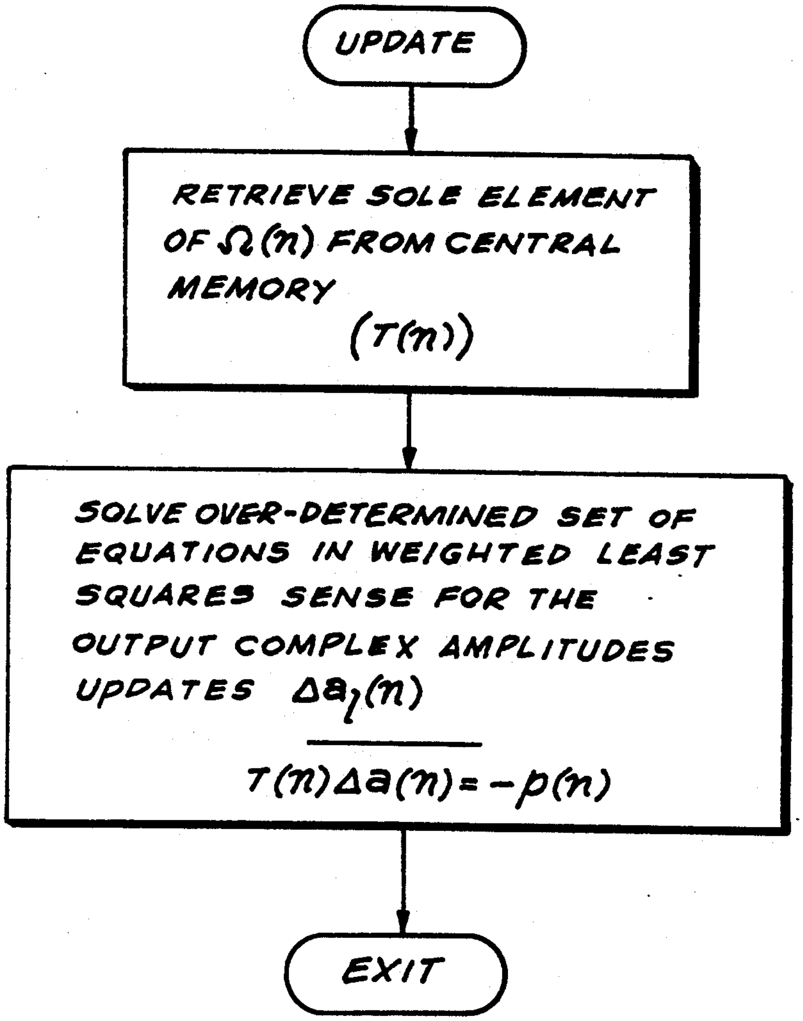
FIG. 8 is a flow diagram of an alternative UPDATE subroutine suitable for use in the method of FIG. 3C.

The subroutine of FIG. 7A calls the ROW subroutine shown in FIG. 7B to update a particular row of a transfer function matrix T(n). First, the change in the input complex amplitude $\Delta p_m(n)$ of the nth frequency component of the mth sensor 14, which is calculated and stored in a step shown in FIG. 3B, is retrieved from central memory 26. The change in input complex amplitude $\Delta p_m(n)$ retrieved represents the change in the input complex amplitude that occurred immediately following the most recent change in the same frequency component n of the control vibrations. Next, the mth row of the transfer function matrix T(n) is retrieved from central memory 26 and copied to the variables $T'_{m,l}(n)$ in central memory 26, according to the following equation:

$$T_{m,l}(n) = T_{m,l}(n) \tag{12}$$

The most recently calculated and applied output complex amplitude update $\Delta a_l(n)$ for each actuator l is retrieved from central memory 26.

Finally, new elements for the mth row of the transfer function matrix T(n) are calculated. This is accomplished by solving the following overdetermined matrix equation in a weighted least squares sense for the new elements $T_{m,l}(n)$ of the mth row of the transfer function matrix T(n):

$$\begin{vmatrix} \beta_1 & 0 & \cdots & \cdots & 0 \\ 0 & \cdot & & & \cdot \\ \cdot & \beta_2 & \cdot & & \cdot \\ \cdot & & \cdot & \cdot & \cdot \\ \cdot & 0 & \cdot & \cdot & \cdot \\ \cdot & \cdot & \cdot & \cdot & 0 \\ \cdot & \cdot & \cdot & \cdot & \\ 0 & 0 & \cdot\ \cdot & 0 & \beta_L \\ \Delta a_1(n) & \Delta a_2(n) & \cdots & \cdots & \Delta a_L(n) \end{vmatrix} \begin{vmatrix} T_{m,1}(n) \\ T_{m,2}(n) \\ \cdot \\ \cdot \\ \cdot \\ \cdot \\ T_{m,L}(n) \end{vmatrix} = \begin{vmatrix} \beta_1 T_{m,1}(n) \\ \beta_2 T_{m,2}(n) \\ \cdot \\ \cdot \\ \cdot \\ \beta_L T_{m,L}(n) \\ \Delta p_m(n) \end{vmatrix} \tag{13}$$

The complex number $T_{m,l}(n)$ represents the element of the transfer function matrix T(n) in the mth row and lth column. Equations of the form of Equation (13) are commonly referred to as augmented matrix equations in the linear algebra art. The terms $\beta_l$ are scalars and may have different values for each combination of m and n. The matrix Equation (13) represents (L+1) linear equations in L unknowns $T_{m,l}(n)$, and therefore the system of equations represent an overdetermined set of equations. Conceptually, the new row of the transfer function matrix T(n) determined by solving the matrix Equation (13) represents a compromise between the row that would account for the change in the input complex amplitude $\Delta p_m(n)$ observed and the previous values for the row. The larger the factors $\beta_1$ are chosen, the smaller the changes that will occur in the elements $T_{m,l}(n)$ when updated.

As shown in FIG. 3C, following updating of the transfer function matrices according to the method of FIGS. 7A–B, the output complex amplitude updates $\Delta a_l(n)$ are calculated using the UPDATE subroutine shown in FIG. 8. The method shown in FIG. 8 calculates output complex amplitude updates for a particular frequency component n. First, the sole element of the set $\Omega(n)$ is retrieved from central memory 26, i.e., the transfer function matrix T(n) is retrieved. The vector $\Delta a(n)$ of output complex amplitude updates $\Delta a_l(n)$ are calculated by solving the following overdetermined matrix equation in a weighted least squares sense:

$$T(n)\Delta a(n) = -p(n) \tag{14}$$

The solution $\Delta a(n)$ is such that if the transfer function matrix T(n) exactly modeled the actuator-to-sensor response characteristics, the input complex amplitudes $p_m(n)$ of the nth frequency component would be minimized after the digital control signals are updated according to the output complex amplitude updates $\Delta a_l(n)$.

The method in FIGS. 3A–D used in conjunction with the SUBSET subroutine of FIGS. 4A–B, and either the combination of the MATRICES and UPDATE subroutines shown respectively in FIG. 5 and FIGS. 6A–B, or the MATRICES and UPDATE subroutines shown respectively in FIGS. 7A–B and FIG. 8, is the preferred method of operation of an apparatus according to the invention. However, it will be appreciated that if the amount of processing in the update cycle is not of concern or if the number of frequency components in set S is sufficiently small such that the processing time of an update cycle is sufficiently small, all frequency components in set S may be processed each update cycle. In such a case, the SUBSET subroutine shown in FIG. 4 would not be used as shown in FIG. 3B. Rather, all frequency components of the set S would be updated each update cycle as shown in either of the MATRICES/UPDATE subroutine combinations.

While a preferred embodiment of the invention has been illustrated and described, it will be appreciated that various changes, in addition to those previously mentioned herein, can be made therein without departing from the spirit and scope of the invention. For example, the input system 15 could form a sliding average of the digital input signals and store the result in the input memory 24. The averaged digital input signals would then be decomposed by the input system DSP 25. Such modification would decrease the sensitivity of the frequency-domain vibration controller to random vibrations in the region or structure 11. For a similar effect, the input complex amplitudes could be averaged with a sliding average. Thus, the invention can be practiced otherwise than as specifically described herein.

The embodiments of the invention in which an exclusive property or privilege is claimed are defined as follows:

1. A method of reducing repetitive vibrations in a region or structure comprising the steps of:

(a) applying control vibrations at a first number of locations in a region or structure, each of said control vibrations created from a set of control-vibration frequency components, the set of control-vibration frequency components creating each of said control vibrations containing the same frequency components; and, (b) cyclically updating said control vibrations by:

(i) sensing vibrations at a second number of locations in said region or structure;

(ii) decomposing each of said sensed vibrations into a set of sensed-vibration frequency components, the frequency components of the set of sensed-vibration frequency components associated with each of said sensed vibrations being the same as the frequency components of the sets of control-vibration frequency components creating said control vibrations;

(iii) analyzing said sets of sensed-vibration frequency components and using the result of said analysis to select which frequency components of said sets of control-vibration frequency components to update, the number of frequency components selected being less than the number of frequency components contained in said sets of control-vibration frequency components;

(iv) calculating updates for said selected frequency components; and, (v) updating said sets of control-vibration frequency components by updating the selected frequency components of each of said sets of control-vibration frequency components based on said calculated updates.

2. The method claimed in claim 1, wherein said step of analyzing said sets of sensed-vibration frequency components comprises determining the magnitude of the frequency components of said sets of sensed-vibration frequency components based on selected criteria and selecting for updating those frequency components that have the greatest magnitude.

3. The method claimed in claim 2, wherein the step of calculating updates for said selected frequency components comprises the steps of:

(a) obtaining transfer function matrices modeling the effect of changes in frequency components of the control vibrations on corresponding frequency components of the sensed vibrations; and, (b) calculating amplitude and phase updates for the selected frequency components by solving matrix equations that include said transfer function matrices.

4. The method claimed in claim 3, wherein said sets of control-vibration frequency components are stored and wherein said selected frequency components are updated by combining the amplitude and phase updates calculated for said selected frequency components with the amplitude and phase values of the same frequency components of said sets of stored control-vibration frequency components.

5. The method claimed in claim 4, wherein said step of applying control vibrations comprises the steps of:

(a) performing inverse Fast Fourier Transforms on said sets of control-vibration frequency components to obtain control-vibration control signals; and, (b) using said control-vibration control signals to create control vibrations in said region or structure.

6. The method claimed in claims 2 or 5, wherein said sets of control-vibration frequency components contain frequency components corresponding to the fundamental frequency of a source of the repetitive vibrations to be reduced and harmonics thereof.

7. The method claimed in claim 6, wherein the step of decomposing the sensed vibrations comprises synchronously converting said sensed vibrations into digital form and performing Fast Fourier Transforms of said digital form of said sensed vibrations.

8. The method according to claim 7, wherein the application of said control vibrations is synchronized at the same frequency as the synchronization of the conversion of said sensed vibrations into digital form.

9. The method claimed in claim 8, wherein said synchronization of the conversion of said sensed vibrations into digital form and said synchronization of the application of said control vibrations are based on a reference signal derived from said source of repetitive vibrations.

10. The method claimed in claim 9, wherein the frequency of said reference signal is a multiple of the fundamental frequency of said source of repetitive vibrations.

11. The method claimed in claim 10, wherein said first number of locations in the region or structure is less than said second number of locations in the region or structure.

12. An apparatus for reducing repetitive vibrations in a region or structure comprising:

(a) a plurality of actuators for applying control vibrations at a first number of locations in a region or structure;

(b) output means coupled to said plurality of actuators for applying drive signals to said plurality of actuators, each of said drive signals created from a set of control-vibration frequency components, the set of control-vibration frequency components creating each of said control vibrations containing the same frequency components;

(c) a plurality of sensors for sensing vibrations at a second number of locations in the region or structure;

(d) decomposition means coupled to said plurality of sensors for receiving and decomposing each of said sensed vibrations into a set of sensed-vibration frequency components, the frequency components of the set of sensed-vibration frequency components associated with each of said sensed vibrations being the same as the frequency components of the sets of control-vibration frequency components creating said control vibrations; and, (e) controller means coupled to said decomposition means and said output means for:

(i) receiving said sets of sensed-vibration frequency components from said decomposition means;

(ii) analyzing said sets of sensed-vibration frequency components and using the result of said analysis to select which frequency components of said sets of control-vibration frequency components to update, the number of frequency components selected being less than the number of frequency components contained in said sets of control-vibration frequency components;

(iii) calculating updates for said selected frequency components;

(iv) updating said sets of control-vibration frequency components by updating the selected frequency components of each of said sets of stored control-vibration frequency components based on said calculated updates; and, (v) supplying said updated sets of control-vibration frequency components to said output means.

13. The apparatus claimed in claim 12, wherein said output means includes an inverse-decomposition means for producing control-vibration control signals by inverse-decomposing said sets of control-vibration frequency components, and wherein said output means synchronously creates said drive signals from said control-vibration control signals.

14. The apparatus claimed in claim 13, wherein said decomposition means includes digital signal processor means programmed to perform Fast Fourier Transforms and said inverse-decomposition means includes digital signal processor means programmed to perform inverse Fast Fourier Transforms.

15. The apparatus claimed in claim 14, wherein said decomposition means includes sampling means coupled to said plurality of sensors for synchronously sampling the output of said plurality of sensors, producing related digital sample signals and applying said digital sample signals to said digital signal processor means programmed to perform Fast Fourier Transforms.

16. The apparatus claimed in claim 12 or 15, wherein said selected frequency components are selected by determining the magnitude of the frequency components of said sets of sensed-vibration frequency components based on selected criteria and selecting for updating those frequency components that have the greatest magnitude.

17. The apparatus claimed in claim 16, wherein said updates for said selected frequency components are determined by calculating amplitude and phase updates for said selected frequency components by solving matrix equations using transfer function matrices that model the effect of changes in frequency components of the control vibrations on corresponding frequency components of the sensed vibrations.

18. The apparatus claimed in claim 17, wherein said controller means stores said sets of control-vibration frequency components and wherein said selected frequency components are updated by combining the amplitude and phase updates calculated for said selected frequency components with the amplitude and phase values of the same frequency components of said sets of stored control-vibration frequency components.

19. The apparatus claimed in claim 18, wherein said sets of control-vibration frequency components contain frequency components corresponding to the fundamental frequency of a source of the repetitive vibrations to be reduced and harmonics thereof.

20. The apparatus according to claim 19, further comprising:

sensor means for monitoring said source of repetitive vibrations and producing a reference signal whose frequency is based on the fundamental frequency of said source of repetitive vibrations; and, synchronization signal generating means coupled to said sensor means for receiving said reference signal, producing a synchronization signal, and applying said synchronization signal to said sampling means and said output means, said synchronization signal synchronizing the sampling of the output of said plurality of sensors and synchronizing the creating of said drive signals, said synchronization signal having a frequency that is a multiple of the fundamental frequency of said source of repetitive vibrations and is synchronized therewith.

21. The apparatus according to claim 20, wherein said first number of locations in said region or structure is less than said second number of locations in said region or structure.

22. A frequency-domain method of reducing repetitive vibrations in a region or structure comprising the steps of:

(a) applying control vibrations at a plurality of first locations in a region or structure, each of said control vibrations created from a set of control-vibration frequency components, the set of control-vibration frequency components creating each of said control vibrations containing the same frequency components; and, (b) cyclically updating said control vibrations by:

(i) sensing the vibrations at a plurality of second locations in said region or structure;

(ii) decomposing each of said sensed vibrations into a set of sensed-vibration frequency components, the frequency components of the set of sensed-vibration frequency components associated with each of said sensed vibrations being the same as the frequency components of the sets of control-vibration frequency components creating said control vibrations;

(iii) updating transfer function matrices that model the effect of changes in selected frequency components of said sets of control-vibration frequency components on corresponding frequency components of said sets of sensed-vibration frequency components based on summations that include summing in a weighted manner:

(1) the effect of previous updates of said selected frequency components of said sets of control-vibration frequency components on corresponding frequency components of said sets of sensed-vibration components; and (2) present elements of said transfer function matrices;

(iv) calculating updates for said selected frequency components using said updated transfer function matrices and said sets of sensed-vibration frequency components, and (v) updating said selected frequency components of said sets of control-vibration frequency components based on said calculated updates.

23. The method claimed in claim 22, wherein said transfer function matrices that model the effect of changes in selected frequency components of said sets of control-vibration frequency components on the corresponding frequency components of said sets of sensed-vibration frequency components are updated row-by-row and wherein for a particular second location, m, the related row of a particular transfer function matrix, T(n), is updated by solving in a weighted least-squares sense, the following matrix equation:

$$\begin{vmatrix} \beta_1 & 0 & \cdot & \cdot & \cdot & \cdot & 0 \\ 0 & & & \cdot & & & \cdot \\ \cdot & \beta_2 & & \cdot & & & \cdot \\ \cdot & & & \cdot & \cdot & & \cdot \\ \cdot & 0 & & \cdot & & \cdot & \cdot \\ \cdot & \cdot & & \cdot & \cdot & & 0 \\ \cdot & \cdot & & \cdot & & \cdot & \\ 0 & 0 & & \cdot & \cdot & 0 & \beta_L \\ \Delta a_1(n) & \Delta a_2(n) & \cdot & \cdot & \cdot & \cdot & \Delta a_L(n) \end{vmatrix} \begin{vmatrix} T_{m,1}(n) \\ T_{m,2}(n) \\ \cdot \\ \cdot \\ \cdot \\ \cdot \\ T_{m,L}(n) \end{vmatrix} = \begin{vmatrix} \beta_1 T_{m,1}(n) \\ \beta_2 T_{m,2}(n) \\ \cdot \\ \cdot \\ \cdot \\ \beta_L T_{m,L}(n) \\ \Delta p_m(n) \end{vmatrix}$$

where:

$\beta_1, \beta_2, \ldots, \beta_L$ are scalars, each of which is associated with a particular first location identified by the subscript;

$\Delta a_1(n), \Delta a_2(n), \ldots, \Delta a_L(n)$ are complex numbers, each of which represents the most recent update of the amplitude and phase of a frequency component, n, of the set of control-vibration frequency components of the control vibration applied at a particular first location identified by the subscript;

$T'_{m,1}(n), T'_{m,2}(n), \ldots, T'_{m,L}(n)$ are complex numbers, each of which is the present element for said particular second location, m, and a particular first location identified by the second subscript;

$T_{m,1}(n), T_{m,2}(n), \ldots, T_{m,L}(n)$ are complex numbers, each of which is the replacement element for said particular second location, m, and a particular first location identified by the second subscript; and, $\Delta p_m(n)$ is a complex number that represents the change in the amplitude and phase of the same frequency component, n, of the set of sensed-vibration frequency components of the vibration sensed at said particular second location, m, following the most recent updates.

24. The method claimed in claim 22 or 23, wherein said step of calculating updates for said selected frequency components comprises calculating amplitude and phase updates using particular updated transfer function matrices, T(n), by solving the matrix equation:

$$T(n)\Delta a(n) = -p(n)$$

where:

p(n) is a vector of complex numbers representing the amplitudes and phases of a frequency component, n, of said sets of sensed-vibration frequency components; and $\Delta a(n)$ is a vector of the complex numbers representing the amplitude and phase updates for the same frequency component, n, of said sets of control-vibration frequency components, whose lth element is a complex number, $\Delta a_l(n)$, that represents the amplitude and phase update for the frequency component, n, of the set of control-vibration frequency components of the control vibration applied at a particular first location, l.

25. The method claimed in claim 24, wherein said plurality of first locations is less than said plurality of second locations and wherein said $T(n)\Delta a(n) = -p(n)$ matrix equation is solved in a weighted least-squares sense by solving the matrix equation:

$$T^{T*}(n)U(n)T(n)\Delta a(n) = -T^{T*}(n)U(n)p(n)$$

wherein superscript T* denotes the complex-conjugate transpose operation and U(n) is a diagonal matrix of scalars.

26. The method claimed in claim 25, wherein the matrix U(n)T(n) is stored in decomposed form and said $T^{T*}(n)U(n)T(n)\Delta a(n) = -T^{T*}(n)U(n)p(n)$ matrix equation is solved by performing back substitution.

27. The method according to claim 26, wherein said sets of control-vibration frequency components are stored and wherein a frequency component, n, of the set of control-vibration frequency components of the control vibration applied at a particular first location, l, is updated according to the following equation:

$$a_l(n) + \Delta a_l(n) \rightarrow a_l(n)$$

where:

$a_l(n)$ is a complex number representing the amplitude and phase of the frequency component, n; and $\Delta a_l(n)$ is a complex number representing the amplitude and phase update for the same frequency component, n.

28. The method claimed in claim 27, wherein said step of applying control vibrations comprises the steps of:

(a) performing inverse Fast Fourier Transforms on said sets of control-vibration frequency components to obtain control-vibration control signals; and, (b) using said control-vibration control signals to create control vibrations in said region or structure.

29. The method claimed in claim 28, wherein the step of decomposing the sensed vibrations comprises synchronously converting said sensed vibrations into digital form and performing Fast Fourier Transforms on said digital form of said sensed vibrations.

30. The method claimed in claim 29, wherein said sets of control-vibration frequency components contain frequency components corresponding to the fundamental frequency of a source of the repetitive vibrations to be reduced and harmonics thereof.

31. The method according to claim 30, wherein the application of said control vibrations is synchronized at the same frequency as the synchronization of the conversion of said sensed vibrations into digital form.

32. The method claimed in claim 31, wherein said synchronization of the conversion of said sensed vibrations into digital form and said synchronization of the application of said control vibrations are based on a reference signal derived from said source of repetitive vibrations.

33. The method claimed in claim 32, wherein the frequency of said reference signal is a multiple of the fundamental frequency of said source of repetitive vibrations.

34. The method claimed in claim 33, wherein the number of said selected frequency components is less than the number of frequency components contained in said sets of control-vibration frequency components, and wherein said selected frequency components are selected by analyzing said sets of sensed-vibration frequency components and using the result of said analysis to select frequency components.

35. The method claimed in claim 34, wherein said analysis of said sets of sensed-vibration frequency components comprises determining the magnitude of the frequency components of said sets of sensed-vibration frequency components based on selected criteria and wherein said selected frequency components are selected by selecting those frequency components of said sets of sensed-vibration frequency components that have the greatest magnitude.

36. An apparatus for reducing repetitive vibrations in a region or structure comprising:

(a) a plurality of actuators for applying control vibrations at a first number of locations in a region or structure;

(b) output means coupled to said plurality of actuators for applying drive signals to said plurality of actuators, each of said drive signals created from a set of control-vibration frequency components, the set of control-vibration frequency components creating each of said drive signals containing the same frequency components;

(c) a plurality of sensors for sensing vibrations at a second number of locations in the region or structure;

(d) decomposition means coupled to said plurality of sensors for receiving and decomposing each of said sensed vibrations into a set of sensed-vibration frequency components, the frequency components of the set of sensed-vibration frequency components associated with each of said sensed vibrations being the same as the frequency components of the sets of control-vibration frequency components creating said drive signals; and, (e) controller means coupled to said decomposition means and said output means for:

(i) receiving said sets of sensed-vibration frequency components from said decomposition means;

(ii) updating transfer function matrices that model the effect of changes in selected frequency components of said sets of control-vibration frequency components on corresponding frequency components of said sets of sensed-vibration frequency components based on summations that include summing in a weighted manner:

(1) the effect of previous updates of said selected frequency components of said sets of control-vibration frequency components on corresponding frequency components of said sets of sensed-vibration components; and (2) present elements of said transfer function matrices;

(iii) calculating updates for said selected frequency components using said updated transfer function matrices and said sets of sensed-vibration frequency components;

(iv) updating said selected frequency components of said sets of control-vibration frequency components based on said calculated updates; and, (v) supplying said updated sets of control-vibration frequency components to said output means.

37. The apparatus claimed in claim 36, wherein said output means includes an inverse-decomposition means for producing control-vibration control signals by inverse-decomposing said sets of control-vibration frequency components, and wherein said output means synchronously creates said drive signals from said control-vibration control signals.

38. The apparatus claimed in claim 37, wherein said decomposition means includes digital signal processor means programmed to perform Fast Fourier Transforms and said inverse-decomposition means includes digital signal processor means programmed to perform inverse Fast Fourier Transforms.

39. The apparatus claimed in claim 38, wherein said decomposition means includes sampling means coupled to said plurality of sensors for synchronously sampling the output of said plurality of sensors, producing related digital sample signals and applying said digital sample signals to said digital signal processor means programmed to perform Fast Fourier Transforms.

40. The apparatus claimed in claim 36 or 39, wherein said transfer function matrices that model the effect of changes in selected frequency components of said sets of control-vibration frequency components on the corresponding frequency components of said sets of sensed-vibration frequency components are updated row-by-row and wherein for a particular sensor, m, the related row of a particular transfer function matrix, T(n), is updated by solving in a weighted least-squares sense, the following matrix equation:

$$
\begin{vmatrix}
\beta_1 & 0 & \cdot & \cdot & \cdot & 0 \\
0 & & \cdot & & & \cdot \\
\cdot & \beta_2 & \cdot & & & \cdot \\
\cdot & & \cdot & \cdot & & \cdot \\
\cdot & 0 & \cdot & & \cdot & \cdot \\
\cdot & \cdot & \cdot & \cdot & & 0 \\
\cdot & \cdot & \cdot & \cdot & & \\
0 & 0 & \cdot & \cdot & 0 & \beta_L \\
\Delta a_1(n) & \Delta a_2(n) & \cdot & \cdot & \cdot & \Delta a_L(n)
\end{vmatrix}
\begin{vmatrix}
T_{m,1}(n) \\ T_{m,2}(n) \\ \cdot \\ \cdot \\ \cdot \\ \cdot \\ T_{m,L}(n)
\end{vmatrix}
=
\begin{vmatrix}
\beta_1 T_{m,1}(n) \\ \beta_2 T_{m,2}(n) \\ \cdot \\ \cdot \\ \cdot \\ \beta_L T_{m,L}(n) \\ \Delta p_m(n)
\end{vmatrix}
$$

where:

$\beta_1, \beta_2, \ldots, \beta_L$ are scalars, each of which is associated with a particular actuator identified by the subscript;

$\Delta a_1(n), \Delta a_2(n), \ldots, \Delta a_L(n)$ are complex numbers, each of which represents the most recent update of the amplitude and phase of a frequency component, n, of the set of control-vibration frequency components of the control vibration applied by a particular actuator identified by the subscript;

$T'_{m,1}(n), T'_{m,2}(n), \ldots, T'_{m,L}(n)$ are complex numbers, each of which is the present element for said particular sensor, m, and a particular actuator identified by the second subscript;

$T_{m,1}(n), T_{m,2}(n), \ldots, T_{m,L}(n)$ are complex numbers, each of which is the replacement element for said particular sensor, m, and a particular actuator identified by the second subscript; and, $\Delta p_m(n)$ is a complex number that represents the change in the amplitude and phase of the same frequency component, n, of the set of sensed-vibration frequency components of the vibration sensed by said particular sensor, m, following the most recent updates.

41. The apparatus claimed in claim 40, wherein calculating updates for said selected frequency components comprises calculating amplitude and phase updates using particular updated transfer function matrices, T(n), by solving the matrix equation:

$$T(n)\Delta a(n) = -p(n)$$

where:

p(n) is a vector of complex numbers representing the amplitudes and phases of a frequency component, n, of said sets of sensed-vibration frequency components; and Δa(n) is a vector of the complex numbers representing the amplitude and phase updates for the same frequency component, n, of said sets of control-vibration frequency components, whose lth element is a complex number, $\Delta a_l(n)$, that represents the amplitude and phase update for the frequency component, n, of the set of control-vibration frequency components of the control vibration applied by a particular actuator, l.

42. The apparatus claimed in claim 41, wherein said plurality of actuators is less than said plurality of sensors and wherein said $T(n)\Delta a(n) = -p(n)$ matrix equation is solved in a weighted least-squares sense by solving the matrix equation:

$$T^{T^*}(n)U(n)T(n)\Delta a)(n) = -T^{T^*}(n)U(n)p(n)$$

wherein superscript T* denotes the complex-conjugate transpose operation and U(n) is a diagonal matrix of scalars.

43. The apparatus claimed in claim 42, wherein the matrix U(n)T(n) is stored in decomposed form and said $T^{T^*}(n)U(n)T(n)\Delta a(n) = -T^{T^*}(n)U(n)p(n)$ matrix equation is solved by performing back substitution.

44. The apparatus claimed in claim 43, wherein said sets of control-vibration frequency components are stored and wherein a frequency component, n, of the set of control-vibration frequency components of the control vibration applied at a particular actuator, l, is updated according to the following equation:

$$a_l(n) + \Delta a_l(n) \rightarrow a_l(n)$$

where:

$a_l(n)$ is a complex number representing the amplitude and phase of the frequency component, n; and $\Delta a_l(n)$ is a complex number representing the amplitude and phase update for the same frequency component, n.

45. The apparatus claimed in claim 44, wherein said sets of control-vibration frequency components contain frequency components corresponding to the fundamental frequency of a source of the repetitive vibrations to be reduced and harmonics thereof.

46. The apparatus according to claim 45, further comprising:

sensor means for monitoring said source of repetitive vibrations and producing a reference signal whose frequency is based on the fundamental frequency of said source of repetitive vibrations; and, synchronization signal generating means coupled to said sensor means for receiving said reference signal, producing a synchronization signal, and applying said synchronization signal to said sampling means and said output means, said synchronization signal synchronizing the sampling of the output of said plurality of sensors and synchronizing the creation of said drive signals, said synchronization signal having a frequency that is a multiple of the fundamental frequency of said source of repetitive vibrations and is synchronized therewith.

47. The apparatus claimed in claim 46, wherein the number of said selected frequency components is less than the number of frequency components contained in said sets of control-vibration frequency components, and wherein said selected frequency components are selected by analyzing said sets of sensed-vibration frequency components and using the result of said analysis to select frequency components.

48. The apparatus claimed in claim 47, wherein said analysis of said sets of sensed-vibration frequency components comprises determining the magnitude of the frequency components of said sets of sensed-vibration frequency components based on selected criteria and wherein said selected frequency components are selected by selecting those frequency components of said sets of sensed-vibration frequency components that have the greatest magnitude.

49. A frequency-domain method of reducing repetitive vibrations in a region or structure comprising the steps of:

(a) applying control vibrations at a first plurality of locations in a region or structure, each of said control vibrations created from a set of stored control-vibration frequency components, the set of stored control-vibration frequency components creating each of said control vibrations containing the same frequency components; and, (b) cyclically updating said control vibrations by:

(i) sensing the vibrations at a second plurality of locations in the region or structure;

(ii) decomposing each of said sensed vibrations into a set of sensed-vibration frequency components, the frequency components of the set of sensed-vibration frequency components associated with each of said sensed vibrations being the same as the frequency components of the sets of control-vibration frequency components creating said control vibrations;

(iii) calculating update estimates for selected frequency components of said sets of control-vibration frequency components using said sets of sensed-vibration frequency components and a plurality of transfer function matrices, said transfer function matrices modeling the effect of changes in frequency components of the control vibrations on corresponding frequency components of the sensed vibrations;

(iv) determining updates for said selected frequency components by interpolation using said plurality of update estimates; and, (v) updating said sets of control-vibration frequency components by updating the selected frequency components of said sets of control-vibration frequency components based on said updates determined by interpolation.

50. The method claimed in claim 49, wherein the transfer function matrices used for calculating update estimates for a specific frequency component, n, of said selected frequency components are chosen from a plurality of stored transfer function matrices based on predetermined criteria.

51. The method claimed in claim 50, wherein said predetermined criteria for choosing said transfer function matrices are choosing those stored transfer function matrices that are nearest to said specific frequency component, n, in terms of frequency.

52. The method claimed in claim 49 or 51, wherein said step of calculating update estimates for selected frequency components comprises solving the matrix equation:

$$T^e(i)\Delta a^e(i) = -p(n)$$

where:

p(n) is a vector of complex numbers representing the amplitudes and phases of a specific selected frequency component, n, of said sets of sensed-vibration frequency components;

$\Delta a^e(i)$ is a vector of complex numbers representing the amplitude and phase update estimates for the same frequency component, n, of said sets of control-vibration frequency components; and, $T^e(i)$ is one of said transfer function matrices.

53. The method claimed in claim 52, wherein said first number of locations in the region or structure is less than said second number of locations in the region or structure and wherein said $T^e(i)\Delta a^e(i) = -p(n)$ matrix equation is solved in a weighted least-squares sense by solving the matrix equation:

$$(T^e(i))^{T*}U(i)T^e(i)\Delta a^e(i) = -(T^e(i))^{T*}U(i)p(n)$$

wherein superscript T* is the complex-conjugate transpose operation and U(i) is a diagonal matrix of scalars.

54. The method claimed in claim 53, wherein the matrix $U(i)T^e(i)$ is stored in decomposed form and said $(T^e(i))^{T*}U(i)T^e(i)\Delta a^e(i) = -(T^e(i))^{T*}U(i)p(n)$ matrix equation is solved by performing back substitution.

55. The method claimed in claim 54, wherein three transfer function matrices for each specific selected frequency component, n, are chosen and wherein the three chosen transfer function matrices for each specific frequency component, n, are used to calculate three update estimate vectors for that frequency component.

56. The method claimed in claim 55, wherein each of the three update estimate vectors associated with a specific frequency component, n, includes an update estimate for said specific frequency component, n, of each of said sets of control-vibration frequency components and wherein the three update estimates for said specific frequency component, n, of each of said sets of control-vibration frequency components are quadratically interpolated to the frequency of said specific frequency component, n, to obtain the amplitude and phase update for said frequency component, n, of that set of control-vibration frequency components.

57. The method according to claim 56, wherein said sets of control-vibration frequency components are stored and, wherein a frequency component, n, of the set of control-vibration frequency components of the control vibration applied at a particular first location, l, is updated according to the following equation:

$$a_l(n) + \Delta a_l(n) \rightarrow a_l(n)$$

where:

- $a_l(n)$ is a complex number representing said amplitude and phase of the frequency component, n; and
- $\Delta a_l(n)$ is a complex number representing the amplitude and phase update for the same frequency component, n.

58. The method according to claim 57, wherein said step of applying control vibrations comprises the steps of:

(a) performing inverse Fast Fourier Transforms on said sets of control-vibration frequency components to obtain control-vibration control signals; and, (b) using said control-vibration control signals to create control vibrations in said region or structure.

59. The method claimed in claim 58, wherein the step of decomposing the sensed vibrations comprises synchronously converting said sensed vibrations into digital form and performing Fast Fourier Transforms on said digital form of said sensed vibrations.

60. The method claimed in claim 59, wherein said sets of control-vibration frequency components contain frequency components corresponding to the fundamental frequency of a source of the repetitive vibrations to be reduced and harmonics thereof.

61. The method according to claim 60, wherein the application of said control vibrations is synchronized at the same frequency as the synchronization of the conversion of said sensed vibrations into digital form.

62. The method according to claim 61, wherein said synchronization of the conversion of said sensed vibrations into digital form and said synchronization of the application of said control vibrations are based on a reference signal derived from said source of repetitive vibrations.

63. The method claimed in claim 62, wherein the frequency of said reference signal is a multiple of the fundamental frequency of said source of repetitive vibrations.

64. The method claimed in claim 63, wherein the number of said selected frequency components is less than the number of frequency components contained in said sets of control-vibration frequency components, and wherein said selected frequency components are selected by analyzing said sets of sensed-vibration frequency components and using the result of said analysis to select frequency components.

65. The method claimed in claim 64, wherein said analysis of said sets of sensed-vibration frequency components comprises determining the magnitude of the frequency components of said sets of sensed-vibration frequency components based on selected criteria and wherein said selected frequency components are selected by selecting those frequency components of said sets of sensed-vibration frequency components that have the greatest magnitude.

66. An apparatus for reducing repetitive vibrations in a region or structure comprising:

(a) a plurality of actuators for applying control vibrations at a first number of locations in a region or structure;

(b) output means coupled to said plurality of actuators for applying drive signals to said plurality of actuators, each of said drive signals created from a set of control-vibration frequency components, the set of control-vibration frequency components creating each of said drive signals containing the same frequency components;

(c) a plurality of sensors for sensing vibrations at a second number of locations in the region or structure;

(d) decomposition means coupled to said plurality of sensors for receiving and decomposing each of said sensed vibrations into a set of sensed-vibration frequency components, the frequency components of the set of sensed-vibration frequency components associated with each of said sensed vibrations being the same as the frequency components of the sets of control-vibration frequency components creating said drive signals; and, (e) controller means coupled to said decomposition means and said output means for:

(i) receiving said sets of sensed-vibration frequency components from said decomposition means;

(ii) using said sets of sensed-vibration frequency components and transfer function matrices modeling the effect of changes in frequency components of the control vibrations on corresponding frequency components of the sensed vibrations to calculate update estimates for selected frequency components of said sets of control-vibration frequency components;

(iii) determining updates for said selected frequency components by interpolation using said plurality of update estimates;

(iv) updating said sets of control-vibration frequency components by updating the selected frequency components of said sets of control-vibration frequency components based on said updates determined by interpolation; and, (v) supplying said updated sets of control-vibration frequency components to said output means.

67. The apparatus claimed in claim 66, wherein said output means includes an inverse-decomposition means for producing control-vibration control signals by inverse-decomposing said sets of control-vibration frequency components, and wherein said output means synchronously creates said drive signals from said control-vibration control signals.

68. The apparatus claimed in claim 67, wherein said decomposition means includes digital signal processor means programmed to perform Fast Fourier Transforms and said inverse-decomposition means includes digital signal processor means programmed to perform inverse Fast Fourier Transforms.

69. The apparatus claimed in claim 68, wherein said decomposition means includes sampling means coupled to said plurality of sensors for synchronously sampling the output of said plurality of sensors, producing related digital sample signals and applying said digital sample signals to said digital signal processor means programmed to perform Fast Fourier Transforms.

70. The apparatus claimed in claim 66 or 69, wherein the transfer function matrices used for calculating update estimates for a specific frequency component, n, of said selected frequency components are chosen from a plurality of stored transfer function matrices based on which of said transfer function matrices are nearest to said specific frequency component, n, in terms of frequency.

71. The apparatus claimed in claim 70, wherein said update estimates for said selected frequency components are calculated by solving the matrix equation:

$$T^e(i)\Delta a^e(i) = -p(n)$$

where:

p(n) is a vector of complex numbers representing the amplitudes and phases of a specific selected frequency component, n, of said sets of sensed-vibration frequency components;

$\Delta a^e(i)$ is a vector of complex numbers representing the amplitude and phase update estimates for the same frequency component, n, of said sets of control-vibration frequency components; and, $T^e(i)$ is one of said chosen transfer function matrices.

72. The apparatus claimed in claim 71, wherein said first number of locations in the region or structure is less than said second number of locations in the region or structure and wherein said $T^e(i)\Delta a^e(i) = -p(n)$ matrix equation is solved in a weighted least-squares sense by solving the matrix equation:

$$(T^e(i))^{T^*}U(i)T^e(i)\Delta a^e(i) = -(T^e(i))^{T^*}U(i)p(n)$$

wherein superscript T* is the complex-conjugate transpose operation and U(i) is a diagonal matrix of scalars.

73. The apparatus claimed in claim 72, wherein the matrix $U(i)T^e(i)$ is stored in decomposed form and said $(T^e(i))^{T^*}U(i)T^e(i)\Delta a^e(i) = -(T^e(i))^{T^*}U(i)p(n)$ matrix equation is solved by performing back substitution.

74. The apparatus claimed in claim 73, wherein three transfer function matrices for each specific selected frequency component, n, are chosen and wherein the three chosen transfer function matrices for each specific frequency component, n, are used to calculate three update estimate vectors for that specific frequency component.

75. The apparatus claimed in claim 74, wherein each of the three update estimate vectors associated with a specific selected frequency component, n, includes an update estimate for said specific frequency component, n, of each of said sets of control-vibration frequency components and wherein the three update estimates for said specific frequency component, n, of each of said sets of control-vibration frequency components are quadratically interpolated to the frequency of said specific frequency component, n, to obtain the amplitude and phase update for said frequency component, n, of that set of control-vibration frequency components.

76. The apparatus claimed in claim 75, wherein said controller means stores said sets of control-vibration frequency components and wherein a frequency component, n, of the set of control-vibration frequency components of the control vibration applied at a particular first location, l, is updated according to the following equation:

$$a_l(n) + \Delta a_l(n) \rightarrow a_l(n)$$

where:

$a_l(n)$ is a complex number representing said amplitude and phase of the frequency component, n;

$\Delta a_l(n)$ is a complex number representing the amplitude and phase update for the same frequency component, n.

77. The apparatus claimed in claim 76, wherein said sets of control-vibration frequency components contain frequency components corresponding to the fundamental frequency of a source of the repetitive vibrations to be reduced and harmonics thereof.

78. The apparatus according to claim 77, further comprising:

sensor means for monitoring said source of repetitive vibrations and producing a reference signal whose frequency is based on the fundamental frequency of said source of repetitive vibrations; and, synchronization signal generating means coupled to said sensor means for receiving said reference signal, producing a synchronization signal, and applying said synchronization signal to said sampling means and said output means, said synchronization signal synchronizing the sampling of the output of said plurality of sensors and synchronizing the creation of said drive signals, said synchronization signal having a frequency that is a multiple of the fundamental frequency of said source of repetitive vibrations and is synchronized therewith.

79. The apparatus claimed in claim 78, wherein the number of said selected frequency components is less than the number of frequency components contained in said sets of control-vibration frequency components, and wherein said selected frequency components are selected by analyzing said sets of sensed-vibration frequency components and using the result of said analysis to select frequency components.

80. The apparatus claimed in claim 79, wherein said analysis of said sets of sensed-vibration frequency components comprises determining the magnitude of the frequency components of said sets of sensed-vibration frequency components based on selected criteria and wherein said selected frequency components are selected by selecting those frequency components of said sets of sensed-vibration frequency components that have the greatest magnitude.

* * * * *

UNITED STATES PATENT AND TRADEMARK OFFICE
CERTIFICATE OF CORRECTION

PATENT NO. : 5,233,540

DATED : August 3, 1993

INVENTOR(S) : A. O. Andersson et al.

It is certified that error appears in the above-identified patent and that said Letters Patent is hereby corrected as shown below:

| COLUMN | LINE | |
|---|---|---|
| 12 | 67 & 68 | after "particu-lar" insert --frequency-- |
| 19 | 27 | "squres" should read --squares-- |
| 31 | 1 | "$T^{T*}(n)U(n)T(n)\Delta a)(n) = - T^{T*}(n)U(n)p(n)$" should read --$T^{T*}(n)U(n)T(n)\Delta a(n) = -T^{T*}(n)U(n)p(n)$-- |

Signed and Sealed this

Twenty-second Day of March, 1994

Attest:

BRUCE LEHMAN

*Attesting Officer*

*Commissioner of Patents and Trademarks*